US009817153B2

(12) United States Patent
Liszicasz et al.

(10) Patent No.: US 9,817,153 B2
(45) Date of Patent: Nov. 14, 2017

(54) GRAVITY TRANSDUCER SYSTEM AND METHOD INCLUDING A JUNCTION WITH A FIRST METAL AND A SECOND METAL

(71) Applicant: NXT Energy Solutions, Inc., Calgary (CA)

(72) Inventors: George Liszicasz, Calgary (CA); Xiang Gui, Calgary (CA); Roes A. Budiman, Calgary (CA)

(73) Assignee: NXT ENERGY SOLUTIONS, INC., Calgary (CA)

( * ) Notice: Subject to any disclaimer, the term of this patent is extended or adjusted under 35 U.S.C. 154(b) by 243 days.

(21) Appl. No.: 14/550,779

(22) Filed: Nov. 21, 2014

(65) Prior Publication Data
US 2015/0101407 A1 Apr. 16, 2015

Related U.S. Application Data

(63) Continuation-in-part of application No. PCT/US2013/042315, filed on May 22, 2013.
(Continued)

(51) Int. Cl.
*G01V 7/00* (2006.01)

(52) U.S. Cl.
CPC .................... *G01V 7/005* (2013.01)

(58) Field of Classification Search
CPC ........... G01V 7/005; G01V 3/00; G01V 7/16; G01M 1/12; H01S 3/09; H01S 1/06;
(Continued)

(56) References Cited

U.S. PATENT DOCUMENTS

| 4,920,313 A | 4/1990 | Constant |
| 4,992,656 A | 2/1991 | Clauser |

(Continued)

FOREIGN PATENT DOCUMENTS

WO   WO 2013/177340 A1   11/2013

OTHER PUBLICATIONS

International Search Report & Written Opinion dated Jan. 11, 2016 corresponding to International Patent Application No. PCT/CA2015/051160.
(Continued)

*Primary Examiner* — Harshad R Patel
*Assistant Examiner* — Brandi Hopkins
(74) *Attorney, Agent, or Firm* — Squire Patton Boggs (US) LLP

(57) ABSTRACT

An airborne gravity-based transducer is disclosed as two embodiments with similar physical structures but different operating principles. The first design includes a particle acting as an active interface characterized by internal vibrations relating to its de Broglie wave, a resonant cavity for trapping the particle, and a phonon-wave source wherein the de Broglie and phonon waves interact over a junction area. In the second design, mechanical displacements between the transducer elements can be monitored through electromechanical transduction. Both designs include a power source and a biasing circuit for producing an electrical current across the junction, and a sensing system for measuring voltage. Both designs are capable of cancelling slowly-varying gravitational acceleration due to dynamic interaction in motion with the gravitational field and responding to small-scale gravity anomalies. The transducer can be utilized in hydrocarbon exploration to provide information on areas conducive to fluid entrapment in the sedimentary column.

17 Claims, 22 Drawing Sheets

Related U.S. Application Data

(60) Provisional application No. 61/650,413, filed on May 22, 2012.

(58) Field of Classification Search
CPC ........ H01S 1/02; H03B 17/00; H03H 3/0076; H03H 9/2463; H03H 2009/02496; H03H 3/0077
USPC ........... 73/382 G, 382 R; 324/300–302, 331, 324/257; 702/5
See application file for complete search history.

(56) References Cited

U.S. PATENT DOCUMENTS

| | | | |
|---|---|---|---|
| 5,917,195 | A | 6/1999 | Brown |
| 2002/0092350 | A1 | 7/2002 | Etkin et al. |
| 2004/0000910 | A1 | 1/2004 | Tryggvason |
| 2005/0197773 | A1 | 9/2005 | Brewster et al. |
| 2007/0010946 | A1 | 1/2007 | MacFarlane et al. |
| 2008/0020935 | A1 | 1/2008 | Volfson |
| 2008/0163682 | A1 | 7/2008 | Van Kann et al. |
| 2011/0012693 | A1 | 1/2011 | Casset et al. |

OTHER PUBLICATIONS

Japanese Office Action Notice of Reason for Rejection application No. 2015-514168 dated Feb. 19, 2016.
Russian Office Action application No. 2014151766 dated Apr. 12, 2016.
Chinese Office Action application No. 201380039132.9 dated Jun. 3, 2016.
Mexican Office Action application No. MX/a/2014/014309 dated May 25, 2016.
Russian Office Action application No. 2014151766 dated Sep. 8, 2016.
Canadian Office Action application No. 2,874,450 dated Sep. 20, 2016.
Canadian Notice of Allowance issued in corresponding Canadian Application No. 2,874,450 dated Apr. 26, 2017.
R. Colella et al., "Observation of Gravitationally Induced Quantum Interference", Physical Review Letters, vol. 34., No. 23, Jun. 9, 1975, XP055327288, pp. 1472-1474. Retrieved from the Internet: URL: http://www.rpi.edu/dept/phys/Courses/PHYS6510/PhysRevLett.34.1472.pdf [Retrieved on Dec. 8, 2016].
M. Vol Moody, et al., "Three-axis Superconducting Gravity Gradiometer for Sensitive Gravity Experiments", Review of Scientific Instruments, vol. 73, No. 11, Nov. 1, 2002, AIP, Melville, NY, US, pp. 3957-3974, XP012039483, ISSN: 0034-6748, DOI: 10.1063/1.1511798.
T. J. Hayes, et al., "A Gravity Gradient Method for Characterizing the Post-Seismic Deformation Field for a Finite Fault", Geophysical Journal International, vol. 173, No. 3, Jun. 1, 2008, pp. 802-805, XP055327234, ISSN: 0956-540X, DOI: 10.1111/j.1365-246X.2008.03795.x.
Supplementary European Search Report issued in corresponding European Application No. 13794555.6 dated Dec. 21, 2016.
Mexican Office Action issued in corresponding Mexican Application No. MX/a/2014/014309 dated Jan. 23, 2017.
Japanese Office Action issued in corresponding Japanese Patent Application No. 2015-514168 dated Jan. 31, 2017.
Chinese Office Action issued in corresponding Chinese Patent Application No. 201380039132.9 dated Feb. 28, 2017.

GRAVITY TRANSDUCER SYSTEM AND METHOD INCLUDING A JUNCTION WITH A FIRST METAL AND A SECOND METAL

CROSS-REFERENCE TO RELATED APPLICATIONS

This application is a continuation-in-part of copending International Application No. PCT/US2013/042315 filed May 22, 2013, which claims the benefit of U.S. Provisional Patent Application No. 61/650,413 filed May 22, 2012. All of the aforementioned applications are incorporated herein by reference in their entirety.

FIELD OF THE INVENTION

This invention relates in general to gravity transducers, and more particularly to the detection of minute variation of the gravitational field induced by subsurface density and stress, and even more particularly to an application of such a transducer to hydrocarbon exploration.

BACKGROUND OF THE INVENTION

Gravity variations have been detected using suspended large masses on the order of kilograms. It was believed the masses had to be large because the force of gravity is the weakest known force. More recently, atom interferometry, and in particular, accelerometers utilizing interferometry have been proposed as gravitational probes. See, for example, B. M. Anderson, J. M. Taylor and V. M. Galitski, "Interferometry with synthetic gauge fields", *Physical Review A*, 83, 031602(R), 2011.

These devices have practical limitations. The devices using large masses can only detect large variations in the gravitational field. There are a number of complex technical challenges to overcome so as to make interferometers practical for field operations. Some of these requirements include cooling and keeping atoms near absolute zero and removing unwanted inertial effects. Thus, it would be highly desirable to have a device that could detect relatively small gravity fluctuations, such as those due to density and subsurface stress changes in porous rocks relating to geologic features of interest, and which could be used conveniently at reasonable temperatures, such as room temperature.

BRIEF DESCRIPTION OF THE DRAWINGS

FIG. 11 is a signal for a test flight line crossing Ladyfern gas field, BC, Canada along a maximum stress line in the plains;

FIG. 12 shows a signal from a second test flight line Burnt Timber gas field, AB, Canada using the same sensor as used in FIG. 11, and along a maximum stress line, but in the foothills;

FIG. 13 shows signals from a third test flight crossing Ladyfern gas field, BC, Canada, using the same sensor as used for FIGS. 11 and 12, but in this case the flight is along a minimum stress line;

DETAILED DESCRIPTION OF THE PREFERRED EMBODIMENTS

Figure 1:
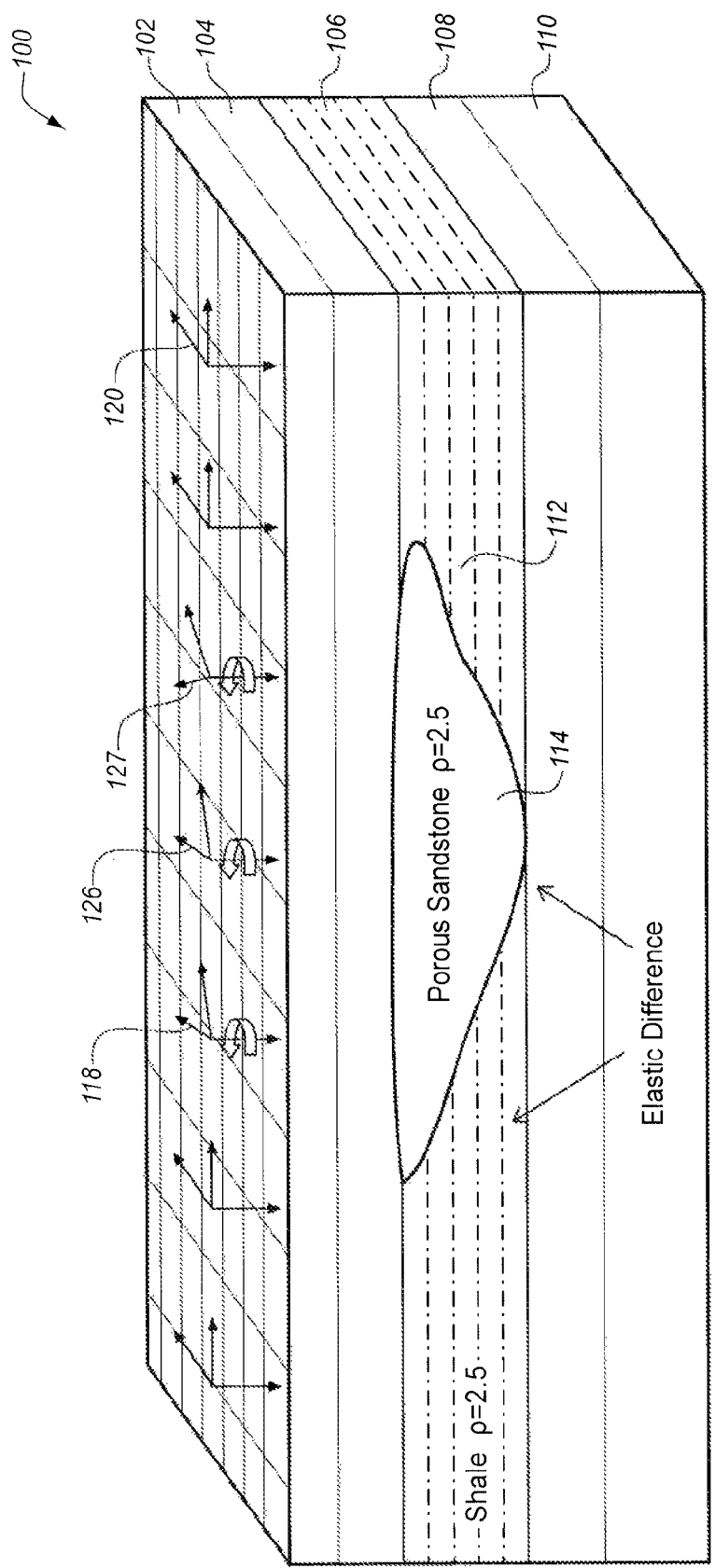
FIG. 1 is a diagram illustrating a typical geologic feature that the invention may be useful in distinguishing.

The present application discloses a small-scale gravity-based transducer with sufficient stability. The device is experimentally tested, and consistent results of the airborne surveys have been obtained. The new device and the system that controls it have the ability of stand-alone reliability.

Embodiments of a practical gravity transducer device utilizing one or more of the following three design elements are disclosed herein: (i) the transducer is in a continuous rectilinear motion to operate; (ii) the transducer is detecting the gravity changes using either active interface or relative displacements between two mechanical elements of the transducer; (iii) the transducer is utilizing an electromechanical conversion by applying electrical current across the contact area between the elements that register the relative displacement. The specific application of the embodiments described herein is to the detection of potential hydrocarbon deposits.

As will be seen in detail below, the presence of fluid, e.g., trapped water and/or hydrocarbon, in porous rocks causes the density to decrease and produces a negative gravity change with respect to the background. In the course of detecting the potential hydrocarbon deposits, the embodiments disclosed also detect other geologic features within a sedimentary basin, such as lithological changes and faults. Fluids in reservoir rocks, lithologic changes or faults tend to have a net effect of reducing the density locally, which is also accompanied by subsurface stress changes. A feature of the two typical embodiments of this invention is that both employ a continuous rectilinear motion. Fundamentally, all present gravimeters and gravity gradiometers take static measurements; therefore, these static instruments (1) require or approach static equilibrium; (2) are incapable of obtaining a continuous time-dependent gravity signal; and (3) are incapable of taking measurements and/or detecting gravity changes at sensors natural vibrational frequency.

In both embodiments, the gravity transducer system utilizes (1) a combination of high altitude (up to 3,000 m) and high speed (up to 500 km/h) which provides an increased frequency domain; (2) a high sample rate (e.g., 2,000 samples per second) which provides fine spatial-scale detection ability.

In both embodiments, there is a gravity transducer system comprising: a junction comprising a first metal and a second metal different from the first metal; the first metal is the pin and the second metal is the bead. The junction forms a capacitance when the two metals are not in direct contact.

The present application discloses a small-scale device for airborne geophysical exploration, which is sufficiently stable and for which the results are consistent. Thus, the new device and system have the ability to provide stand-alone reliability.

Embodiments of a practical gravitational field detector are disclosed herein. The specific application of the embodiments described herein is to the detection of potential hydrocarbon deposits. As will be seen in detail below, the geologic density and stress changes in the region of hydrocarbon deposits in the earth's crust are different from background regions. The transducer described herein detects those differences. In the course of detecting the potential hydrocarbon deposits, it has been found that the embodiments disclosed also detect other geologic features within a sedimentary basin, such as lithologic changes and faults. It will also be evident to one skilled in the art that the stress field detector and the specific embodiments described has and will have many additional features and applications.

FIG. 1 is a diagram illustrating a typical geologic feature 100 that the embodiments described herein may be useful in distinguishing. An exemplary area 110 of a sedimentary basin having a plurality of sedimentary layers 102, 104, 106, 108 and 110 is illustrated, which area includes areas having shale sequence 112 surrounding a porous sandstone formation 114, which may contain fluid, such as, for example, gas, oil, or water. In this example, the porous sandstone and the shale have the same density. Equal density implies equal gravitational acceleration. Therefore, mass-based gravimeters yield the same measurement value over both. However, the two areas will have different stress regimes as suggested by 118, 126, 127, and 120. The shale rock 112, distributes stress and permeability differently from porous sandstone with fluid 114. The difference in the elastic (shear) properties between the shale and the porous sandstone containing significant fluid creates stress anomalies oblivious to conventional gravity detection devices, but detectable by the sensors described herein, due to changes in gravity field vibration associated with the subsurface density and stress perturbations.

I. Detailed Description of the Electronics

Figure 2:
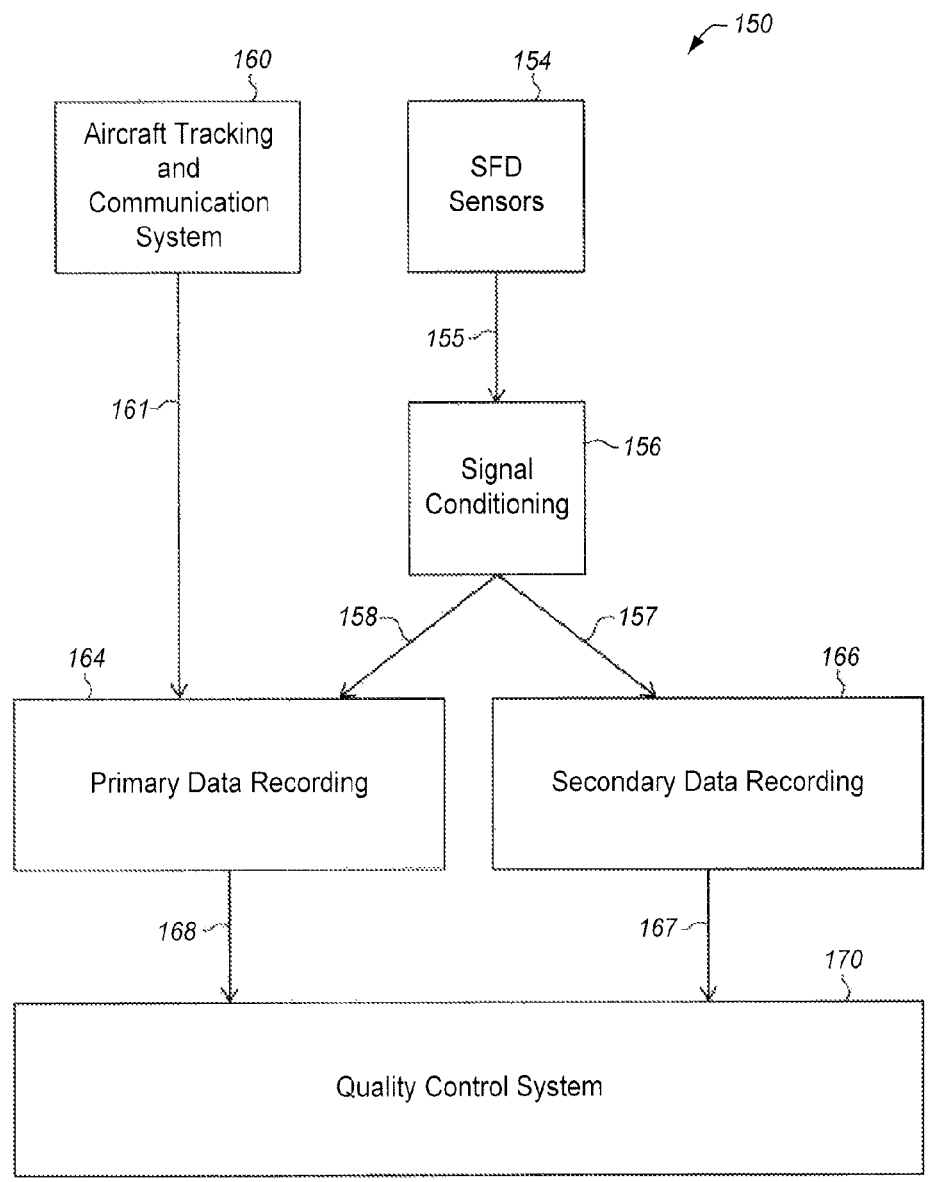
FIG. 2 is a block diagram illustrating the main components of a gravity transducer and detection system that is capable of identifying potential hydrocarbon features.

FIG. 2 is a block diagram illustrating the main components of one embodiment of the gravity transducer and detection system capable of identifying potential hydrocarbon features. As shown in FIG. 2, the system integrates, stress field detection sensors, 154, signal conditioning systems 156, aircraft tracking and communication systems 160, data recording systems 164 and 166, quality control systems 170 including data post-processing systems. All the equipment is self-contained and is connected together through appropriate cabling 155, 161, 158, 157, 167 and 168.

Figure 3A:
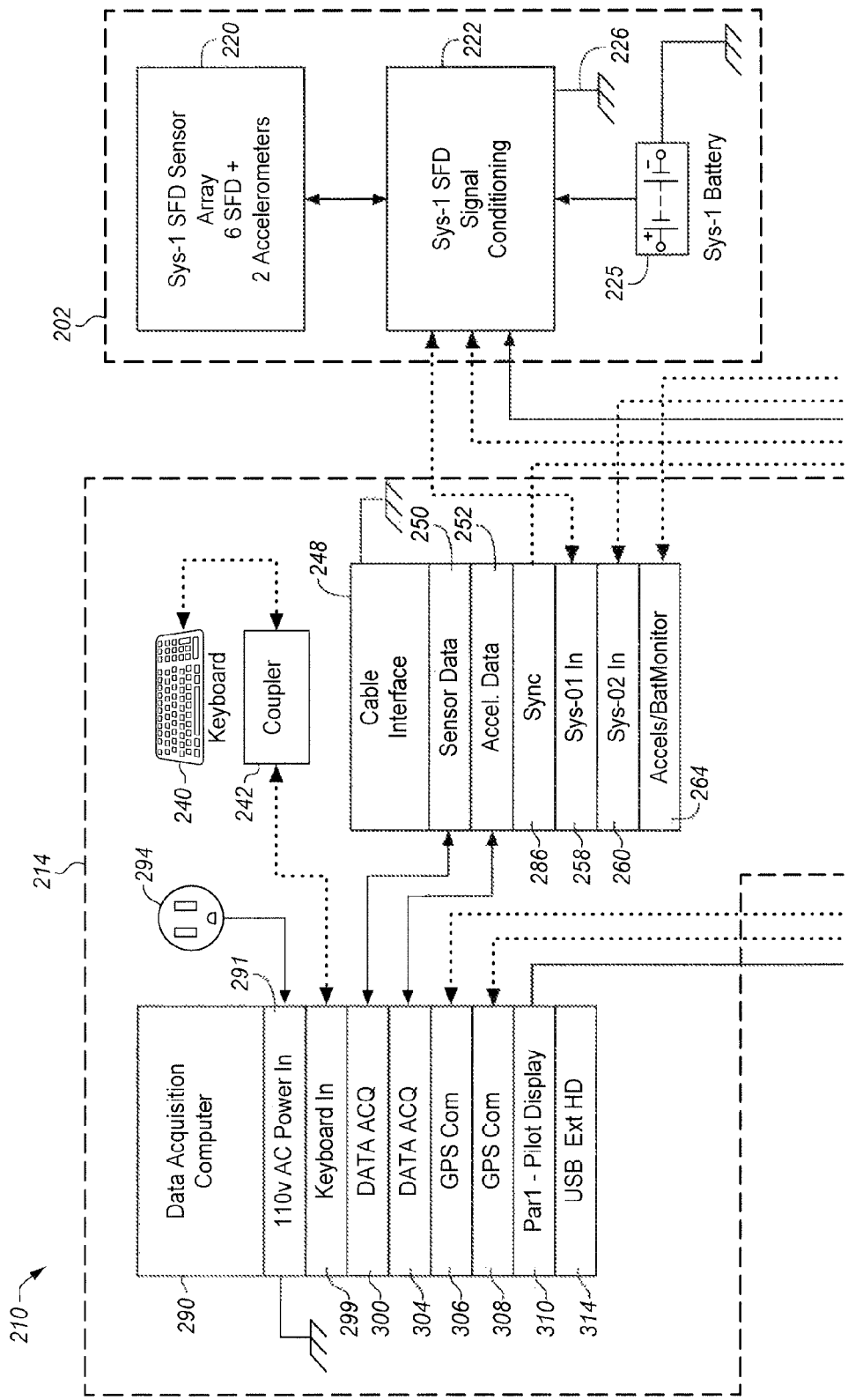
FIGS. 3A and B are detailed block diagrams of the system of FIG. 2 showing the parts and cabling between the parts.
Figure 3B:
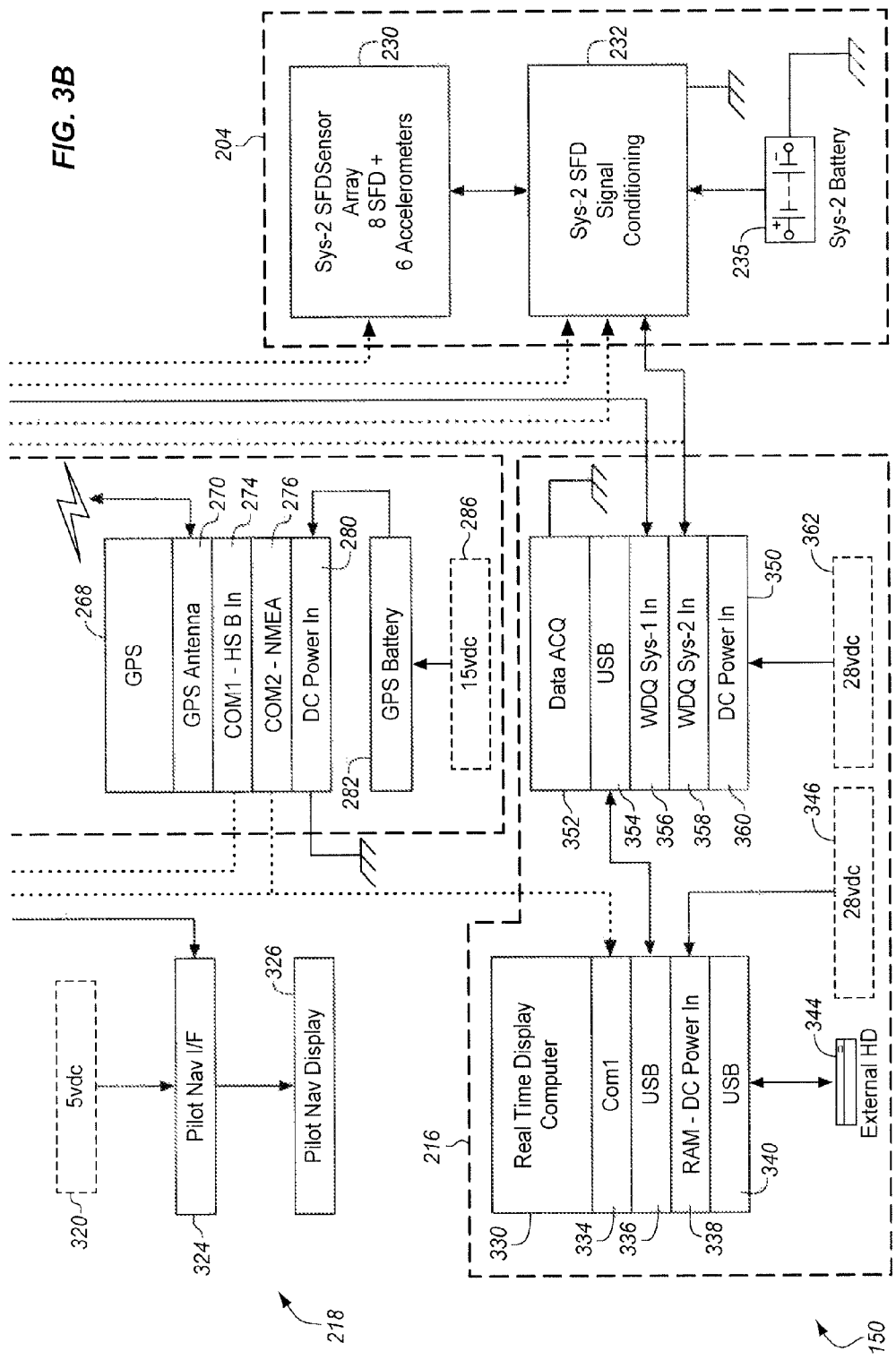

FIG. 3 shows a block circuit diagram showing the individual electronic components of an embodiment of the system 150 incorporated into a survey aircraft. Embodiment 150 includes a first Stress Field Sensor (SFD) system 202, a second SFD system 204, a main data acquisition computer system 214, a real-time display computer system 216, and a pilot navigation system 218. First SFD sensor system 202 includes an SFD sensor array including six SFD sensors and 2 accelerometers. These are contained in a sensor box 220. The structure of the sensors and the sensor boxes will be discussed below. First sensor system 202 also includes an SFD signal conditioning system 222 and a battery 225. Grounds throughout the system 150 are shown by ground symbols, such as 226. Second SFD system 204 includes a sensor box 230 containing eight SFD sensors and six accelerometers. Second system 204 also includes an SFD signal conditioning system 232 and a battery 235.

One embodiment of main computer 214 includes a QNX 4.25 data acquisition computer 290 together with cards and peripherals including keyboard 240 coupled to a keyboard IN port 299 via coupler 242. Computer 290 is powered from a power source 294, which is powered from the airplane, which power is input into 110 V AC power in unit 291. Data acquisition computer 290 may also include data acquisition card 300 connected to the sensor data input port 250, data acquisition card 304 which is connected to accelerometer data input port 252, GPS serial port 306 which is connected to GPS Com 1 port 274, NMEA/qtalk serial port 308 which is connected to GPS Com 2 port 276, pilot display output 310, and USB port 314 which provides output to an external hard drive. Coupler 242 may be a cable or a wireless device and permits the keyboard to be moved about the airplane. Computer 214 may include: cable interface 248, M6259 2 kHz data input interface 250, with up to 16 channels use by the SFD sensor; M6225 200 Hz data acquisition interface 252 for the accelerometers; a remote start output 256 for synchronizing the mainframe with the other computers; system one input port 258 connected to system one SFD signal conditioner 222; system two input port 260 connected to system two signal conditioner 232; and accelerometer/ battery monitor input 264. Main computer 214 also includes a GPS module 268 which may include: GPS card 268; GPS antenna 270; Com 1 port 274; Com 2 port 276; DC power in port 280; GPS battery 282; and 15 volt dc source 286. GPS module 268 runs off battery 282, which is charged from the airplane generator when the airplane is flying.

Pilot navigation system 218 includes 5 volt DC power supply 320, pilot navigation interface 324 which receives the output from the pilot display output 310 of computer 290, and pilot navigation display 326 which is projected onto the windshield of the airplane.

Real-time display computer 216 includes a laptop 330, which may be a Panasonic CF30 with an OziExplorer moving map utility to track survey flights, and a WinDaq data acquisition system to show the SFD waveform during survey and also serve for backup data recording. Laptop 330 may also include communication port 334 connected to the GPS communication ports 304 and 276 of computer 214, a USB port 326, RAM DC power in card 338 connected to 28 V DC power source 346, and USB port 340 connected to external hard drive 344. Real-time display computer 216 also may include mapping module 350 which may include data acquisition card 350, WinDaq input ports 356 and 358, and USB port 354 that connects to USB port 336 on the laptop 330. The WinDaq ports 356 connect to the SFD signal conditioning units 222 and 232, respectively.

Main computer 214 operates to collect and digitize sensor data, accelerometer data, and GPS data. The data acquisition cards mentioned above include analog-digital convertors which digitize the analog outputs of SFD sensors and accelerometers. The accelerometer data serves a quality control function. If the impact of acceleration on the SDF sensors is too high, for example, 1 g or greater, extra care needs to be exercised with respect to data quality. This is performed by correlating accelerometer data with the SFD sensor data by the main computer 214. Main computer 214 also correlates the SFD data with the airplane position data output by the GPS module 268. Real time display computer 216 provides signal outputs during surveys that show the SFD output as a function of time, which waveforms will be discussed in detail below. These waveforms may be output in real time on the display of laptop 330. The time is also correlated to position via the GPS output enabling the system to provide real time display of flights which correlate time with position. Examples of such maps will be shown and discussed below.

Figure 4:
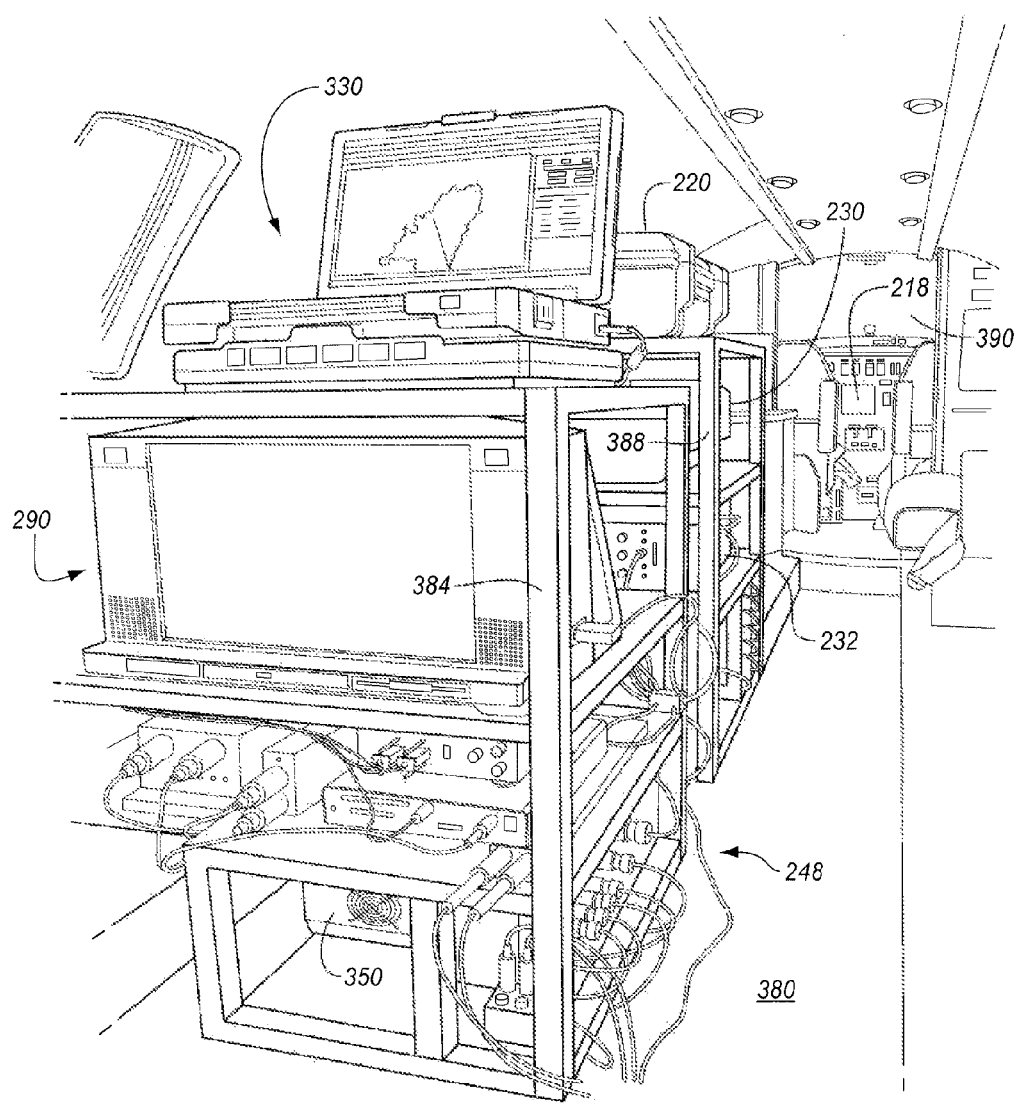
FIG. 4 is a sketch based on a photograph showing the system of FIGS. 2 and 3 in a Cessna Citation 560 aircraft.

FIG. 4 is a sketch of a photograph showing the sensor survey equipment in place aboard a Cessna Citation 560 aircraft 380. Real time display laptop 330 sits at the top of the nearest rack 384, while main computer 290 is directly below it. Mapping module 350 is at the bottom of this rack. Cable interface 248 can be seen at the bottom right of the rack 384. System one SFD sensor case 230 can be seen at the top of second rack 388 while system two sensor cases 230 is below it. System two signal conditioners 232 can be seen on the rack level below the sensor case 230. Navigation module 218 can be seen in the cockpit 390 at the far end of the airplane 380.

Figure 5:
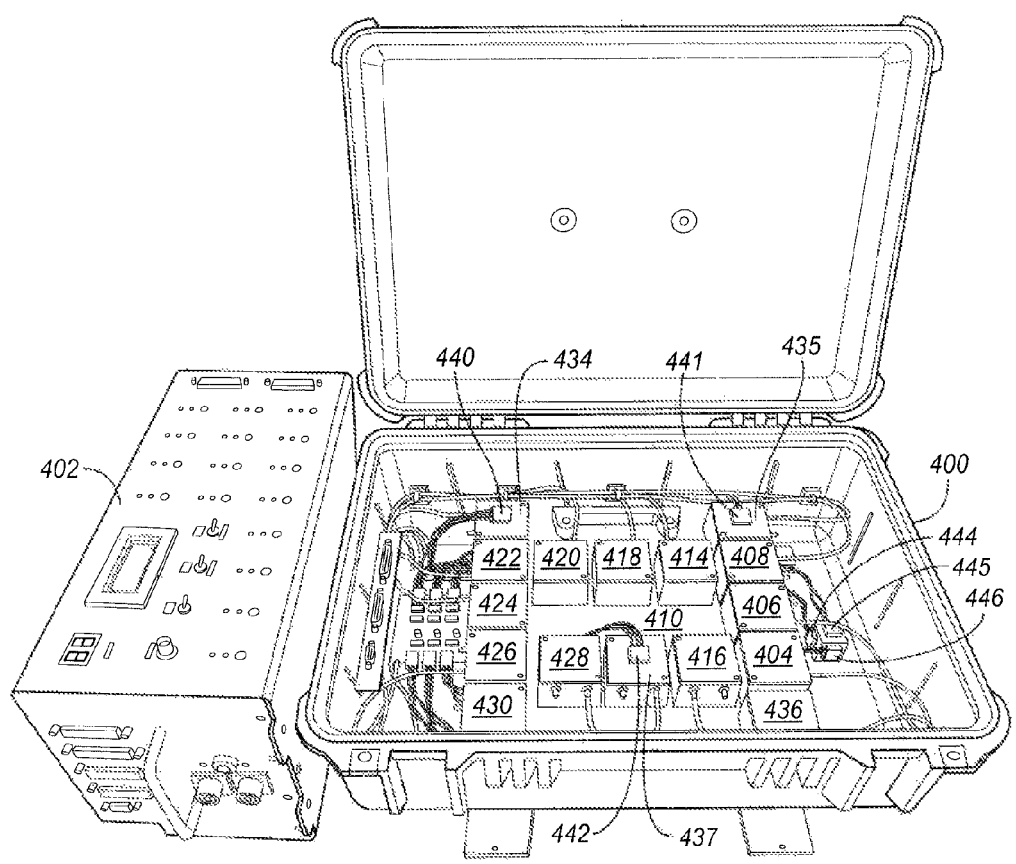
FIG. 5 is a sketch of an open sensor case and an associated signal conditioning unit which are employed in the system of FIG. 4.

FIG. 5 shows one embodiment of an open sensor case 230 and a multiple-channel signal conditioning unit 232. The gravity field sensors are individual units mounted inside a pelican hard case 400 with vibration and shock isolation. In the embodiment of FIG. 5 the vibration and shock isolation comprises a silicone gel mat 410. Sixteen SFD sensors 404, 406, 408, 414, 416, 418, 420, 422, 424, 426, 428, 430, 434, 435, 436 and 437 are mounted on the mat 410. Three accelerometers, 440, 441, and 442 are mounted on top of SFD sensors 434, 435, and 437, respectively, and thus are supported on the mat 410. These accelerometers measure acceleration in each of three orthogonal directions. In addition, three accelerometers 444, 445 and 446 are mounted directly to case 400. These measure acceleration in each of three airframe orthogonal directions. Many other configurations of SFD sensors and accelerometers are possible. Redundancy of SFD sensors and accelerometers is often a feature of embodiments. In one embodiment, signals from fourteen SFD sensors in two separate systems are recorded simultaneously in differential mode to reduce uncertainty of identifying subsurface geologic features and eliminate unwanted noise. In one embodiment, twenty-four SFD sensors are contained in three separate systems.

The gravity field sensor according to the invention is a small-scale device that responds to structural, stratigraphic trapped fluids caused by variations primarily in the horizontal stress directions in the subsurface with respect to density and stress, hence the term Stress Field Detector. One embodiment of the sensor is described in reference to FIGS. 6A-10 below. Depending on the design, the sensor is a two or three terminal transducer that produces a time-varying analog electrical signal, which is fed through a multiple channel signal conditioning unit. The output, in the form of an analog voltage signal, flows into the data acquisition cards where it is converted to a digital signal for display on a computer system. Data may be recorded at 2,000 samples per second.

Figure 6A:
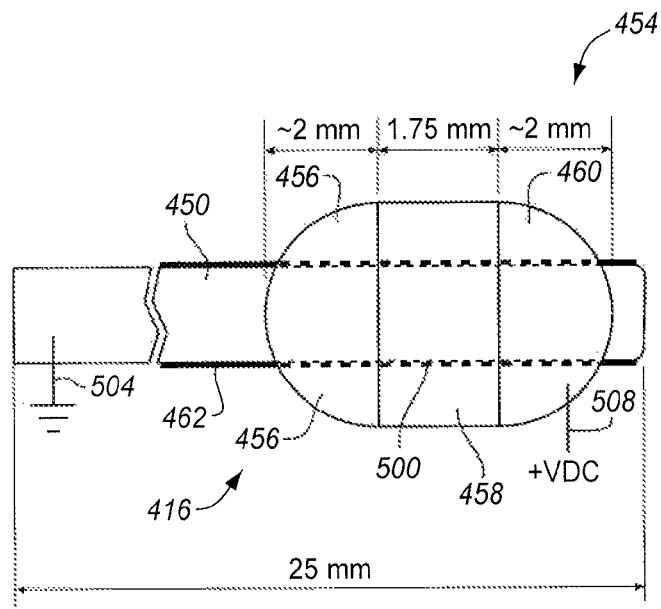
FIG. 6A shows side view of a stress field detector (SFD) sensor showing typical dimensions.
Figure 6B:
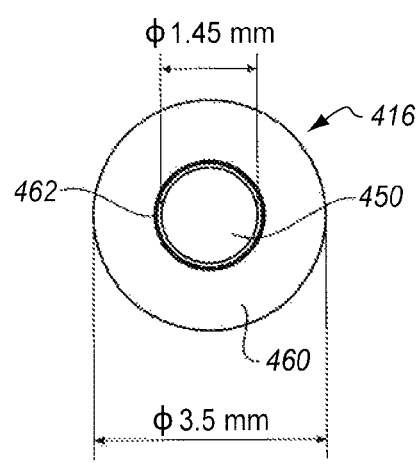
FIG. 6B shows an end plan view of the SFD sensor of FIG. 6A showing typical dimensions.

This embodiment of the gravity transducer system consists of an electromechanical sensor and the associated electronics that processes and records the voltage signal produced by the sensor. FIG. 6 shows side (FIG. 6A) and plan (FIG. 6B) views showing details of one embodiment of an electromechanical sensor 416 according to the invention. This embodiment comprises a pin 450, having a coating 462 and a bead 454 comprising a first half-sphere 456, a disc 458 and second half-sphere 460. In this embodiment both the bead and pin are fixed and relative displacement between them is disallowed and the detection is based on the motion (vibration) of the active interface (trapped particle) 514 in FIG. 10. Pin 450 may be made of gold or copper, though it may be made of other materials. Coating 462 may be made of silver oxide, i.e., Ag2O, though it may be made of other oxides or other dielectrics. The thickness of the coating 462 may be thirty nanometers or less; more preferably, twenty nanometers or less; and most preferably ten nanometers or less. The circular center disc portion 458 of bead 454 may be made of copper, though it may be made of many other metals. Exemplary dimensions of the various parts are shown in FIGS. 6A and 6B. Half-spheres 456 and 460 may be 2 mm long, and may be made of alloys, such as alloys of tin, nickel, lead and silver. In one embodiment, first half-sphere 456 may be 63% Sn and 37% Pb, while second half-sphere 460 may be 96.3% Sn and 3.7% Ag. Disc 458 may be 1.75 mm long. The internal surface of the bead is made relatively rough. Pin 450 may be 25 mm long and 1.45 mm in diameter. The outer diameter of half-spheres 456 and 460 and disc 458 may be 3.5 mm. In operation, pin 450 is held at the ground voltage via contact 504, while bead 454 is held at the positive VDC voltage via contact 508. Some other materials for the sensor components detailed above may also be used such as nickel, carbon, platinum, others and their alloys. Metal oxides that may be used to coat pin 450 include tantalum oxide, aluminum oxide, tin oxide, nickel oxide and others.

Figure 7A:
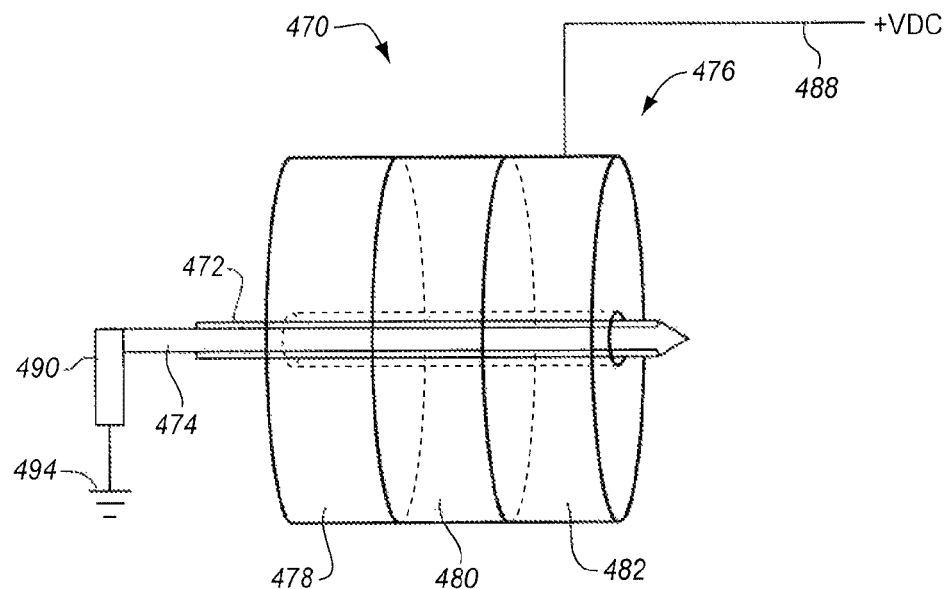
FIG. 7A is a side perspective view of another embodiment of an SFD sensor.
Figure 7B:
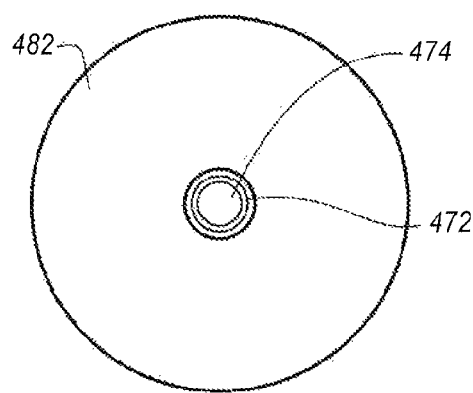
FIG. 7B is an end view of the SFD sensor of FIG. 7A.

FIGS. 7A and 7B are side and plan views showing perspective of another embodiment of a sensor junction 470.

This embodiment includes pin 474, and bead 476 disc 478, disc 480, and disc 482. Pin 474 is coated with coating 472. Pin 474 and disc 480 may be made of a good conductor, such as gold or copper. Discs 478 and 482 may be made of a metal alloy, such as alloys of tin, nickel, lead and silver. Coating 472 may be made of a metal oxide, such as silver oxide or other oxides mentioned above. A pin contact 490 may be made of copper, or other materials mentioned above, and may be grounded at 494. Disc 482 may be connected to the positive VDC voltage. The positive VDC voltage may be typically between 6 and 9 volts. In operation, the position of the pin 450, 474 is adjusted in the bore of the bead 454, 476 using a precision micro-mechanical control, which may be adjusted via a piezo-driven nanopositioner.

Figure 25:
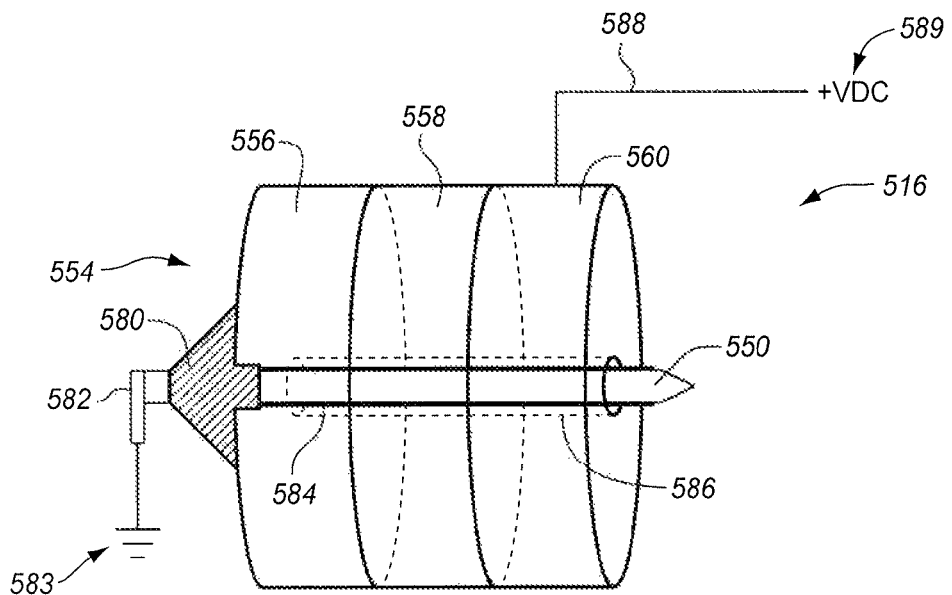
FIG. 25 shows a side view of an embodiment of the electromechanical sensor according to the invention.
Figure 26:
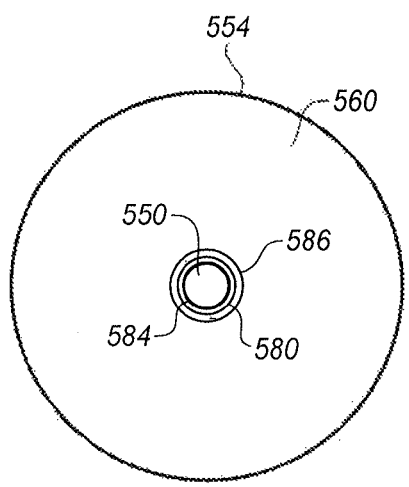
FIG. 26 shows an end plan view of an embodiment of the electromechanical sensor according to the invention.

FIGS. 25 and 26 are side and plan views showing perspective of another embodiment 516 of a sensor junction. This embodiment includes pin 550 and bead 554 consisting of discs 558, 556 and 560. Discs 556 and 560 may be made of a metal alloy, such as alloys of tin, nickel, lead, and silver. The circular center disc portion 558 of bead 554 may be made of copper, though it may be made of many other metals. The internal surface 586 of the bead is made relatively smooth. In this embodiment, relative displacement between the bead and pin are allowed. A thin dielectric polymer spacer 580 that controls bead vibration is placed between the pin 550 and the bead 554. Spacer may be made of a polymeric adhesive containing up to ten percent titanium oxide ($TiO_2$). Other adhesives can also be used. Pin 550 is coated with dielectric material 584. Pin 550 and disc 558 may be made of a good conductor, such as gold and copper. Coating 584 may be made of a metal oxide, such as silver oxide or other oxides mentioned above. A pin contact 582 may be made of copper, or other materials mentioned above, and may be grounded at 583. Bead may be connected to the positive VDC voltage via conductor 588. The positive VDC voltage 589 may be typically between 3 and 9 volts.

In operation for both embodiments, the position of the pin is adjusted in the bore of the bead for optimum response using a precision micro-mechanical control, which may be adjusted via a piezo-driven nanopositioner.

II. Operational Principles

II.1. Transducer Design I: Detection by Active Interface

Figure 8:
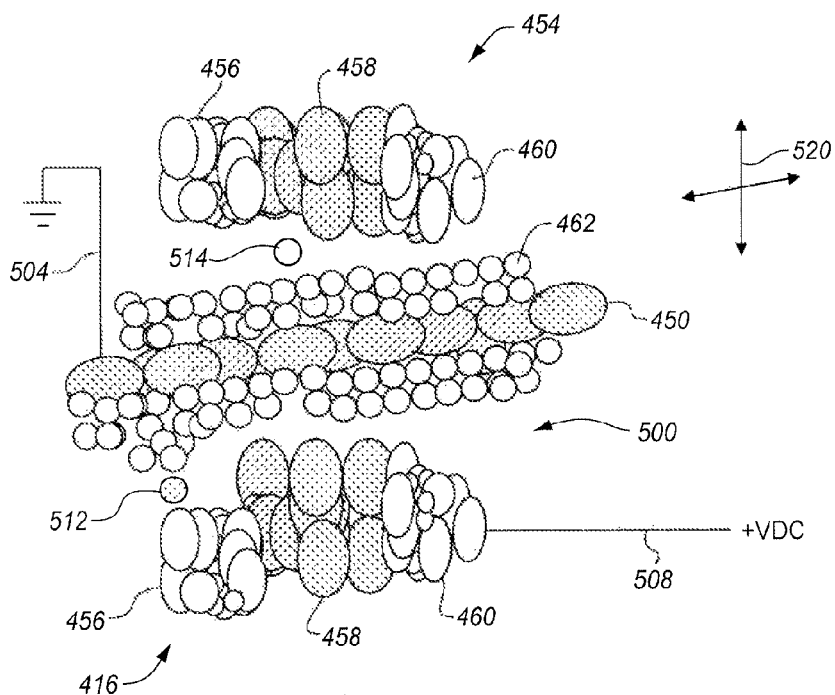
FIG. 8 is a sketch showing a microscopic view of an SFD sensor illustrating how atoms may be trapped forming a sensor junction.

While the system described herein is largely tested against empirical evidence over approximately 15 years, and steady improvement of the system has been made based on the empirical evidence, a discussion in terms of operational principals may be useful in understanding the system. FIG. 8 is a sketch showing a microscopic view of the sensor junction 416 illustrating how electrically neutral or charged particle(s) 512, 514, may be trapped forming an active sensor junction 416. As in FIGS. 6A and 6B, sensor 416 includes a bead 454 and a metal pin 450. Bead 454 includes portions 456 and 460 which may be made of metal alloy and portion 458 which may be made of metal, such as copper. Pin 450 is coated with a coating 462 which may be made of a metal oxide. Pin 450 is grounded at 504 and bead 454 is connected to the +VDC voltage at 508. Pin 450 is adjusted in directions orthogonal to its length, as shown at 520. As pin 450 is adjusted, electrically neutral or charged particle(s), such as 512 and 514 may become suitably trapped between pin 450 and bead 454. When the +VDC voltage is applied across the pin 450 and bead 454, electrical current produces heat, which generates phonons. A particle, such as 514, can become suitably trapped in a phonon resonance forming at electronic junction of dissimilar metals.

Figure 9:
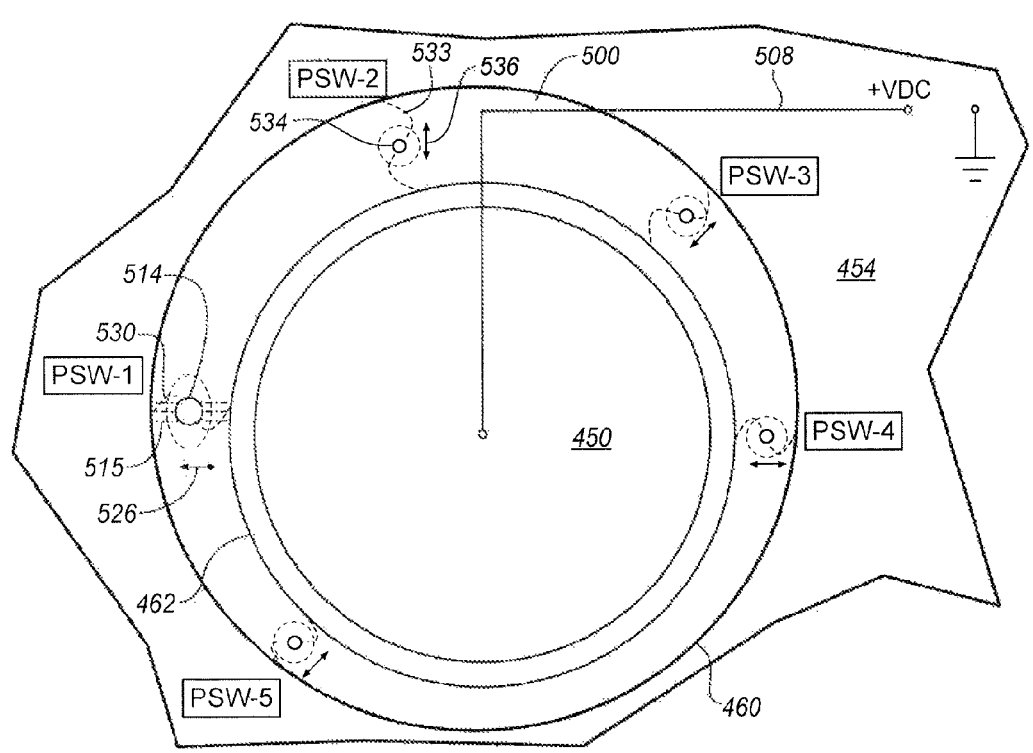
FIG. 9 is a sketch illustrating one embodiment of the invention comprising a multi-junction embodiment, each comprising a superposition of the wave of a trapped particle and the phonon wave generated in the junction cavity.
Figure 10:
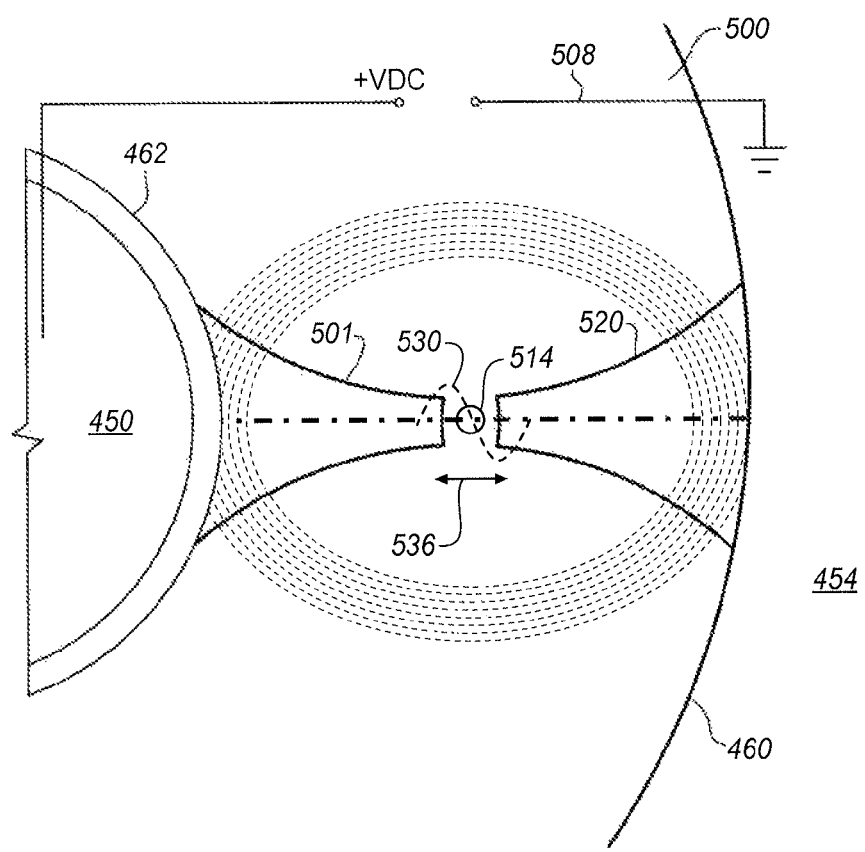
FIG. 10 is a sketch illustrating a standing wave of the Trapped Particle and a phonon wave front in a highly constricted region between a metal pin and a metal bead FIGS. 6A through 7B.

FIG. 9 is a sketch illustrating one embodiment comprising a multi-junction embodiment, each comprising a superposition of the wave, such as 515, of a trapped particle, such as 514, and the phonon wave, such as 530, generated in the junction cavity. As shown, adjustment 526 traps particle 514 in a standing phonon wave 530, and adjustment 536 traps particle 533 in a phonon standing wave 534. The trapped particle is confined in the gap 500 between oxide coating of pin 450 and the inner surface 460 of bead 454. FIG. 10 is a sketch illustrating a trap 520, 501 of a particle 514 between metal pin 450 and a metal bead 460.

The phonon-wave controlled, active interface, resonance transducer is a geophysical sensor system which is capable of detecting subtle variations in the earth's gravitational field. Due to its compact and highly portable configuration, the sensor is easily employed in airborne survey applications, which ideally position it as a rapid and cost-effective tool for wide-area mineral exploration. The present survey system is designed specifically for oil and gas prospecting. Additional future applications of the system include metallic mineral exploration, kimberlite (diamond) prospecting, locating shallow fresh water beds, the prediction of earthquakes and volcanic eruptions, identifying and testing quantum mechanical interactions, (phenomena and processes), investigating quantum mechanical events in the domain of general relativity, exploring the understanding of the origin of mass, gravity and inertia from the most fundamental laws of physics, and testing general relativity postulates, and potential astronomical and astrophysical observations. However, these applications may require modifications to the current designs and material selection, added control functions and the selection of suitable particles.

The basic operating premise of the active interface is based on the fundamental relationship between stress and gravity.

The vertical stress component of the earth is dominated by gravity acting on the overburden. In contrast, the maximum and minimum horizontal stress components significantly affect horizontal gravity. Accordingly, the majority of gravitational anomalies with orientation changes will occur in the horizontal direction. Hayes showed that stress fields not only will introduce changes in the magnitude of gravity but also couple in the tensor directions (T. J. Hayes, K. F. Tiampo, J. Fernandez, and J. B. Rundle, "A gravity gradient method for characterizing the post-seismic deformation field for a finite fault", *Geophysical Journal International*, 173, 802-805, 2008). By using extensive calculations and models of Joshua Tree Earthquake, Hayes showed that gravity gradiometry will exhibit similar shape as stress model over a finite strike slip motion in horizontal plane. One exception where stress does not follow the gravity gradient is in trapped fluids. If a solid is in contact with a fluid, the shear stress at the interface must be zero (fluids cannot support shear) but the normal component of the stress (i.e., the traction) must be continuous. The effects of seismic shear waves are identical for trapped fluids. Stress fields of trapped fluids, therefore, differ significantly from those of solid rocks and also cause unique gravitational perturbations.

According to general theory of relativity, all forms of energy are sources for the gravitational field, and the addition or subtraction of energy alters the gravitational field potential of an object. Consequently, gravitating bodies will develop real perturbations in the geometry of their gravitational field in response to applied stress. Stressors may include heat, rotation, compression or tension, and the origin of such stressors may be internal or external to the body.

The transducer of the invention is a mesoscopic scale non-linear device designed (1) to selectively respond to stress induced gravitational anomalies; (2) to achieve a dynamical signal integration over time; (3) to reject constant or gradually varying gravitational sources; (4) to perform these functions from high altitudes, e.g., 1,000 to 20,000 feet, and at a high sample rate (e.g., 2,000 samples per second); (5) to allow the interaction of classical and quantum mechanical domains through a specially designed interface. The gravity transducer system exploits the stress-gravity relationship to infer changes in stress patterns within a sedimentary basin and/or in the earth's shallow crust by focusing on the detection of subtle variations in the form of gravity field vibrations coming from density-stress perturbations. To be clear, the gravity transducer system according to the invention is designed to detect anomalies, as variations in vibrations, in the gravity-energy frequency domain, as opposed to measuring the magnitude of acceleration which is what the state-of-the-art conventional gravimeters and gravity gradiometers rely on. As such, the system of the invention represents a substantial departure from known technologies employed in the field geophysics.

A large 'test mass' is unsuitable to measure small distortions in gravity on large scale interactions. Furthermore, large mass has short de Broglie wavelength. In contrast, particle scale mass has long de Broglie wavelength. Energy density is related to mass, and mass could be defined in terms of de Broglie frequency (J. W. G. Wignall, "Proposal for an absolute, atomic definition of mass", *Physical Review Letters*, 68, 5-8, 1992; S.-Y. Lan, P.-C. Kuan, B. Estey, D. English, J. Brown, M. Hohensee, and H. Müller, "A clock directly linking time to a particle's mass", *Science*, 339, 554-557, 2013). Therefore, all vibrations experienced by a mass are fundamentally associated with its de Broglie frequency.

As the sensor is flown though the gravitational field at a high speed, its vibrating active interface is tuned to a specific frequency of interest. This will allow the sensor to interact with the localized gravitational energy density within a specific geometry of space-time relating to specific subsurface density and stress perturbations. The perturbations with an energy density comparable to that of the sensor will bring about localized vibrations interfering with the pre-set vibrations of the sensor and initiate changes in the phonon population within the resonating junction cavity. Thus the resulting electrical waveform output can be used to identify signal attributes indicative of trapped fluids and other geologic features. In addition, orientation effects are induced by subsurface density and in-situ anisotropic "stress states" associated with subsurface discontinuities, which can be detected as the sensor is flown along straight path. Density-stress perturbations associated with buoyancy (an upward force exerted by a fluid that opposes the weight of an immersed object) can be identified as well, based on patterns and frequency shifts.

Short-wavelength gravity field vibrations, such as those produced by density-stress perturbations, can be transferred to particles with the corresponding wavelength of, for instance, the detection element consisting of the phonons and the trapped particle. The process described above allows an efficient energy-momentum transfer and the amplification of the resulting effects of small field vibrations and distortions. SFD probes gravitational energy density spectrum in order to investigate and discern density-stress changes in the subsurface associated with trapped fluids and other geological features. The present invention exploits a novel approach in identifying and describing gravitational effects that were undetectable before.

The device described herein may be a phonon standing wave controlled transducer that consists of a resonant cavity or a low resistance, weakly interacting metal-oxide-metal junction (LONCI Junction) with highly constricted spatial regions. Between the junction terminals a particular non-lattice bound matter structure having its associated wave, i.e., a particle element may be trapped. The particle element will be called the Trapped Particle hereafter. With no excitation applied, the Trapped Particle would naturally oscillate about its equilibrium position. However, with proper excitation, the Trapped Particle may behave as an Active Interface in conjunction with the phonon standing wave in the detection of localized gravitational vibrations or distortions. The coupling of the Trapped Particle matter-wave and the phonon standing wave constitutes the gravity detection mechanism.

Other quantum mechanical devices employ "passive junction interfaces" in which the junction barrier is composed of gas/air or thin film or some other dielectrics, etc., characterized by high resistance and usually operates at extremely low temperatures. In contrast, an active interface sensor may utilize low junction resistance in which particles may move through the junction as waves, as opposed to high resistance junctions of about 4.1 k$\Omega$ or more where particles moves through the junction as particles. Further, the described sensor operates at room temperature and employs Active Interface in a form of a vibrating Trapped Particle matter-wave, which is coupled directly with the phonon standing wave system. The resulting arrangement is used in the detection of highly localized minute vibrational/directional changes in the gravity field.

The LONCI junction is biased by DC current. The passage of the current through the low resistance junction produces Joule heat. When phonons are absorbed in the junction they are rapidly thermalized which raises junction temperature. As a result, the sensor system undergoes excitation and phonons are generated. This results in electron-phonon scattering, junction impedance change, Coulomb blockade formation, and initiates particle tunneling. The system is tuned electromechanically (1) to attain the desired resonance by modifying the cavity dimensions and/or changing junction capacitance, (2) to produce coherent standing phonon wave within the cavity out of two travelling phonon waves in opposite directions, (3) to allow a particle wave complex to couple to the gravity field locally, and (4) to amplify signals, and (5) to exploit stochastic resonance. By the assistance of ubiquitous Johnson-Nyquist electronic noise (due to thermal agitation of charge carriers) generated in the sensor junction, amplification and optimization of extremely weak signals resulting from gravity interactions may be achieved. It also affects sensor mode operations.

As the sensor is moved along a survey path, the matter-wave of the Trapped Particle coupled with the phonon standing wave will stretch, compress or relax in response to field variations. The changing wave system continually affects junction impedance, which is observed as a voltage signal output against time. This is partly due to electron-phonon scattering with controlling electric charge distribution across the junction.

While the impedance change is evident, its cause is not yet fully understood. Some of the processes governing the impedance change are potentially: superposition of coupling of fields and waveforms, phonon-phonon coupling, electron-phonon coupling, Coulomb Blockade formation, and particle tunneling. As bias voltage is applied, charge carriers can tunnel through the junction. Conductance varies according to the charging energy of junction, thermal energy of the system, conductance quantization and spin polarization, as charge carriers move across the oxide layer.

The current transducer system is calibrated to focus on an effective observation window of approximately 0.5 to 1.5 radial kilometers. At this scale, empirical evidence suggests that the majority of gravity effects arise from the interplay of in-situ tectonic stresses acting upon local geologic features. As a result, the inferred stress patterns are often indicative of prospective hydrocarbon trap and reservoir conditions in sedimentary basins including, for example, the presence of fault blocks, channelized reservoirs, or carbonate reefs. Certain other stress patterns may indicate geologic domain changes, such as fault systems, fracture belts, lithologic boundaries, and over-pressure.

II.2. Transducer Design II: Detection by Relative Displacement

Various embodiments of the system described herein are largely tested against empirical evidence, and steady improvement of the system has been made. To understand how the sensor junction detects the gravity anomaly, a mathematical model of classical mechanics for characterizing the relative motion between the pin and the bead may be helpful. In its basic configuration, this mechanical model is comprised of two test masses, two springs, and one damper.

Figure 27:
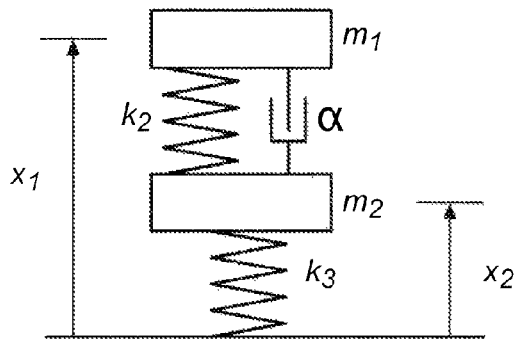
FIG. 27 shows a schematic diagram of one embodiment of a mechanical model of the electrical system according to the invention.

FIG. 27 shows a schematic diagram of a mechanical model. The two test masses $m_1$ and $m_2$ are vertically connected by a spring with spring constant $k_2$ and a damper with damping coefficient $\alpha$. Test mass $m_1$ corresponds to pin 450 and test mass $m_2$ corresponds to bead 454. Test mass $m_2$ is vertically connected to the ground platform by a spring with spring constant $k_3$.

The Lagrangian for the mechanical system described in FIG. 5 is given by $$L = T - V = \frac{(m_1 v_1^2 + m_2 v_2^2)}{2} - \frac{k_3(x_2 - l_3)^2}{2} - \frac{k_2(x_1 - x_2 - l_2)^2}{2} - g(m_1 x_1 + m_2 x_2),$$

where $l_2$ and $l_3$ are equilibrium lengths of the respective springs, and $v_1$ and $v_2$ are the velocities of the respective test masses. The effect of damping is added once we obtain the equations of motion from the Lagrangian. The equation of motion for $m_1$ is obtained by Euler-Lagrange equation augmented by the dissipative force $$\frac{d}{dt}\left(\frac{\partial L}{\partial v_1}\right) = \frac{\partial L}{\partial x_1} + \text{dissipative force},$$

yielding $$m\frac{d^2 x_1}{dt^2} = -k_2(x_1 - x_2 - l_2) - m_1 g - \alpha(v_1 - v_2).$$

The term $-\alpha(v_1 - v_2)$ represents the dissipative force acting on $m_1$. It is zero when both test masses move with the same velocities. Under this condition, the damper does not absorb energy from the motions of the two test masses. If the speed of $m_1$ is higher than that of $m_2$, and both are moving in the same direction, then the dissipative force acts to reduce $m_1$'s speed. If $m_2$'s speed is higher and both are moving in the same direction, then the dissipative force causes $m_1$ to gain more speed. This effect comes about because the two damper ends are attached to two different masses, so that $m_1$ is pushed upward if $m_2$ moves upward with a higher speed, or $m_1$ is pulled downward if $m_2$ moves downward with a higher speed. If, however, both masses move in the opposite directions, then the dissipative force acts to reduce $m_1$'s speed.

The equation of motion for $m_2$ is also obtained by Euler-Lagrange equation added by the dissipative force $$\frac{d}{dt}\left(\frac{\partial L}{\partial v_2}\right) = \frac{\partial L}{\partial x_2} + \text{dissipative force},$$

giving $$m\frac{d^2 x_2}{dt^2} = k_2(x_1 - x_2 - l_2) - k_3(x_2 - l_3) - m_2 g - \alpha(v_2 - v_1).$$

Because mass $m_1$ cannot be lower in position than mass $m_2$, we must have $x_1 - x_2 > 0$. If the spring $k_2$ is a zero-length spring, then we have $x_1 - x_2 \geq 0$. $k_2$ is a zero-length spring if $l_2 = 0$. The sensitive detection of gravitational acceleration changes in this invention relies on isolating the relative displacement between the two masses:

$$\xi = x_1 - x_2.$$

The gravitational acceleration is assumed to have the following time dependence $$g(t) = \begin{cases} g_0 & 0 \leq t < \tau \\ g_0 + \Delta g & t \geq \tau \end{cases},$$

where $g_0$ and $\Delta g$ are constant gravitational acceleration background and gravity anomaly, respectively, and $\tau > 0$.

Assuming that the upper spring ($k_2$) has a zero length when it is in equilibrium, i.e., $l_2 = 0$, the solution for the relative displacement is $$\xi(t) = \frac{m_1 v_1(0)}{\alpha} e^{-k_2 t/\alpha} + \frac{m_1 g_0}{k_2}(e^{-k_2 t/\alpha} - 1) + \frac{m_1 \Delta g}{k_2}(e^{-k_2(t-\tau)/\alpha} - 1)H(t - \tau),$$

where $H(t-\tau)$ is a unit step function that has a value of 1 if $t > \tau$ and zero otherwise. This solution is obtained by assuming that numerically $k_3 > k_2 >> \alpha > m_1 \approx m_2$ in the same system of units. The relative displacement $\xi(t)$ has oscillatory components, which are not included due to the approximations used when performing the Laplace transform inversion. The solution presented above is the slowly-varying envelope function without the high-frequency oscillation components.

The solution $\xi(t)$ above shows that the constant gravitational acceleration background can be completely filtered out by the preferred embodiment. To see this effect, consider immersing the preferred embodiment in the constant background without any presence of gravity anomaly $\Delta g$. The time $t$ is always less than $\tau$ at which the gravity anomaly starts to appear, so that we have only the first two terms of the solution $$\xi(t < \tau) = \frac{m_1 v_1(0)}{\alpha} e^{-k_2 t/\alpha} + \frac{m_1 g_0}{k_2}(e^{-k_2 t/\alpha} - 1).$$

Because of the preferred embodiment's geometric constraint, $m_1$'s position, $x_1$, has to be at least equal to $m_2$'s position, $x_2$, so that $\xi(t < \tau)$ cannot be less than zero. As time progresses, the relative displacement decreases exponentially and will reach zero, indicating that the oscillations due to the constant gravitational background is completely suppressed. The time at which $g_0$ is completely suppressed occurs when $\xi(t<\tau)=0$, yielding $$t_0 = \frac{\alpha}{k_2}\ln\left[1 + \frac{k_2 v_1(0)}{\alpha g_0}\right].$$

Although it is preferable to have $k_2$ to approach zero, the approximation constraint $k_3 > k_2 >> \alpha > m_1 \approx m_2$ requires that $k_2$ is numerically larger than either $\alpha$, $m_1$, or $m_2$ in either SI or Imperial measurement unit system.

Figure 28:
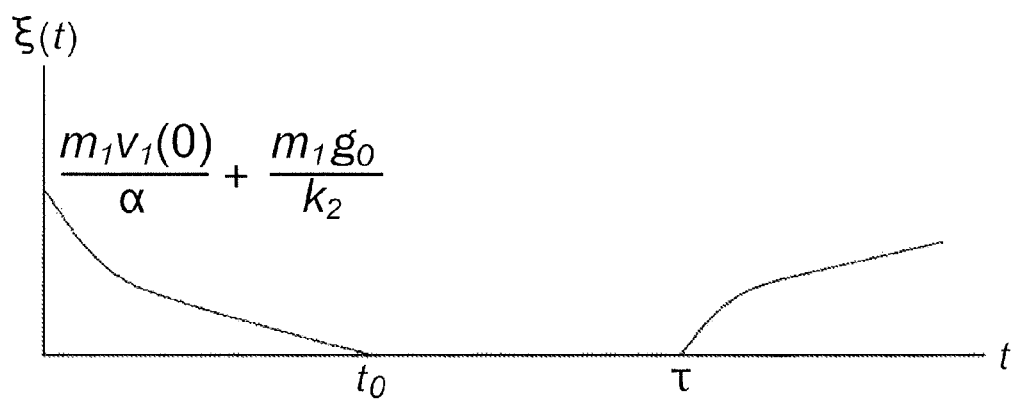
FIG. 28 shows a typical relative displacement of the preferred embodiment of the mechanical model of FIG. 27 when it encounters the time-dependent gravitational acceleration profile due to rectilinear motion.

FIG. 28 shows a typical relative displacement of the preferred embodiment when it encounters the time-dependent gravitational acceleration profile $$g(t) = \begin{cases} g_0 & 0 \leq t < \tau \\ g_0 + \Delta g & t \geq \tau \end{cases}.$$

After the constant $g_0$ is suppressed at time $t_0$ within $0 \leq t \leq \tau$, there will be a gravity anomaly $\Delta g$ occurring at $\tau > t_0$. The solution term carrying the gravity anomaly is $$\frac{m_1 \Delta g}{k_2}(e^{-k_2(t-\tau)/\alpha} - 1);$$

thus, any gravity anomaly with $\Delta g > 0$ will not be detected since it will give a negative relative displacement. The above expression is positive if $\Delta g$ is positive and $t > \tau$. The preferred embodiment thus has two advantages: (i) it suppresses the constant gravitational background, and (ii) it rejects positive gravity anomaly.

The ability of the embodiment to reject positive gravity anomaly is suitable for hydrocarbon exploration. Most, if not all, oil and gas bearing porous rock systems have densities lower than the background density for the constant background $g_0$. The constant background suppression is also suitable for hydrocarbon exploration since the products of standard gravity surveys performed using LaCoste-Romberg gravimeters or full-tensor gradiometers are gravity anomaly maps. The standard gravity surveys require a subtraction of the constant background and a correction due to local topographical variations. Our embodiment performs the subtraction and the correction on-the-fly as the sensor performs a survey from an aircraft.

The relative displacement magnitude due to the gravity anomaly is equal to $$\xi_{\Delta g} = \frac{m_1 \Delta g}{k_2}.$$

The bead's mass in the embodiment is approximately 0.25 grams, while $k_2$ is estimated to be 1.0 Newton/meter. Assuming a gravity anomaly of 1 milligal, which is equal to $10^{-5}$ meter/second$^2$, we obtain $$\xi_{\Delta g} = 0.25 \text{ micrometer.}$$

This small magnitude of displacement would be a challenge to detect in the field, let alone measured, using completely mechanical means. There are many noise sources when generic equipment is deployed in the field and suppressing each noise source remains a huge measurement barrier to overcome. It is noted that 1 milligal gravity anomaly represents the typical current measurement limit of gravimetry (cf., I. Marson, "A short walk along the gravimeters path", *International Journal of Geophysics*, 2012, 687813, 2012).

The constant background suppression technology afforded by the embodiment can effectively block any quasi-steady-state noise source. In the mathematical model presented, $g_0$ can be considered to represent any noise source in the time-dependent gravitational acceleration profile $$g(t) = \begin{cases} g_0 & 0 \leq t < \tau \\ g_0 + \Delta g & t \geq \tau \end{cases}.$$

Our analysis shows that the suppression time is given by $$t_0 = \frac{\alpha}{k_2}\ln\left[1 + \frac{k_2 v_1(0)}{\alpha g_0}\right]$$

for the noise source with a magnitude $g_0$. Therefore, in general, we want to have $$\frac{k_2 v_1(0)}{\alpha} \leq g_0$$

in order to have $t_0$ as small as possible for the noise suppression to work using our embodiment. In the limit $k_2 \to 0$, we have $$\lim_{k_2 \to 0} t_0 = \frac{v_1(0)}{g_0}.$$

For a noise source $g_0$, its suppression depends entirely on the initial velocity of the bead, $v_1(0)$, which in practice cannot be readily controlled by an external means for our embodiment. $v_1(0)$ corresponds to the bead's velocity as the preferred embodiment flies above an area that has a gravitational acceleration $g_0$. A maximum suppression, however, can be achieved in the limit $\alpha \to 0$, yielding $$\lim_{\alpha \to 0} t_0 = 0.$$

The $\alpha \to 0$ limit, however, can never be achieved since even with no spring connecting the bead and the pin, i.e., $k_2 = 0$, there is always drag force that will dampen the relative displacement oscillation in the embodiment. Therefore, we must use $$\lim_{k_2 \to 0} t_0 = \frac{v_1(0)}{g_0}$$

as the limiting behavior of the suppression time $t_0$. For a measurement limit of 1 milligal ($=10^{-5}$ m/s$^2$), we need to have $v_1(0)$ to be at most 0.1 mm/s in order to have $t_0$ on the order of 1 second. This is achieved in our preferred embodiment by making the pin's spring constant as stiff as possible. The preferred embodiment has a pin's effective spring constant of about $10^4$ N/m by placing the bead approximately at 15 mm away from the pin's base and using copper as the material for the pin. Copper has a Young's modulus of 117 GPa and the pin's radius is 0.725 mm.

In the preferred embodiment, the magnitude of the relative displacement is converted into a voltage signal across the electrical junction. The dynamic transducer design is a bead acting as the top test mass, which is inserted into a solid pin acting as the bottom test mass. The schematic diagram of the pin-bead assembly is shown in FIGS. 1 to 4. Under static equilibrium, the bead's inner surface will contact the pin's surface, and the clearance between the inner surface of the bead and the surface of the pin is on the order of the oxide thickness to allow for the bead to oscillate independently of the pin's oscillation. A thin dielectric spacer is placed between the pin and the bead, which is represented by the spring characterized by $k_2$ and the damper characterized by $\alpha$ in FIG. 5.

The static capacitance between the bead and the pin is given by the formula for the capacitance of concentric cylinders $$C_0 = \frac{2\pi\varepsilon_0\varepsilon_r L}{\ln(R_2/R_1)},$$

where L is the bead's length, $R_1$ is the pin's radius, and $R_2$ is the bead's inner radius. The relative displacement $\xi$ between the pin and the bead can be represented by a change in $R_2$, and the resulting change in capacitance is $$\Delta C(t) = -\frac{2\pi\varepsilon_0\varepsilon_r L}{R_2\ln^2(R_2/R_1)}dR_2 = -\frac{C_0}{\ln(R_2/R_1)}\frac{\xi(t)}{R_2}.$$

The factor $\ln(R_2/R_1)<1$ provides an amplification gain to the static capacitance $C_0$, and thus compensates for the small value of $\xi(t)/R_2<1$. It is beneficial to have a small $R_2$ value and to make it close to $R_1$. As a result, the preferred embodiment is small in size and is sensitive in detection. Given that the capacitance C is related to voltage V via $$V = \frac{Q}{C},$$

where Q is electrical charge, we obtain $$\Delta V = -\frac{Q}{C^2}\Delta C,$$

where the voltage change $\Delta V$ is the output signal of the dynamic gravity transducer.

Given that $\Delta C$ is a function of time, we obtain $$\Delta V(t) = -\frac{Q}{C_0^2}\Delta C(t) = \frac{Q}{C_0}\frac{\xi(t)}{R_2\ln(R_2/R_1)}.$$

Because $V_0 = Q/C_0$, we have $$\Delta V(t) = V_0\frac{\xi(t)}{R_2\ln(R_2/R_1)}.$$

The voltage output is therefore proportional to the relative displacement $\xi(t)$. The sub-millimeter range of $\xi_{Ag}=0.25$ micrometer can therefore be amplified with the gain $$\frac{\xi(t)}{R_2\ln(R_2/R_1)}.$$

In our current preferred embodiment, the gain is about 1 due to small $\xi(t)/R_2$ ratio. The preferred embodiment is estimated to give $\ln(R_2/R_1)=1/8$. Miniaturizing the preferred embodiment will increase the gain much further.

Although the output voltage signal $\Delta V(t)$ is directly proportional to the relative displacement $\xi(t)$, the inverse process to obtain the gravity anomaly magnitude $\Delta g$ would require a full characterization of (i) pin-bead assembly's geometry including clearance distances for each sensor used; and (ii) spring constants and damping constant of the pin-bead assembly, which depend sensitively on manufacturing processes.

The baseline voltage $V_0$ may change if electrical current dQ/dt does not stay constant with time or the static capacitance $C_0$ changes, for example, from charge buildup in the oxide layer. A calibration procedure involving electrical charging and discharging cycles of a stationary design in FIG. 7A can be performed with the purpose of determining the charging and discharging time constants. These capacitance time constants should be smaller than the mechanical time constant $\alpha/k_2$ in order to achieve correct interpretations.

The main advantage of putting the design in continuous constant-altitude rectilinear motion is that geologic source of gravity anomaly will produce a sharper profile of gravitational force in the vertical direction. The continuous motion provides for the following gravitational profile used in the analysis of the design $$g(t) = \begin{cases} g_0 & 0 \le t < \tau \\ g_0 + \Delta g & t \ge \tau \end{cases}.$$

To see this sharpening effect, we can consider the design as a point particle of mass, $m_1+m_2$, located at $(x',y',z')$, which interacts gravitationally with a rectangular parallelepiped subsurface region of volume $\Omega=abc$. The gravitational potential energy is $$V = -G(m_1+m_2)\rho\int_0^a dx\int_{-b/2}^{b/2}dy\int_{z_0}^{z_0+c}\frac{dz}{\sqrt{(x'-x)^2+(y'-y)^2+(z'-z)^2}},$$

where the position (x,y,z) belongs to a point within the subsurface volume and $\rho$ is the subsurface density. G is the gravitational constant. If the subsurface thickness c can be assumed to be less than the location depth $z_0$ of the subsurface, the gravitational force in the vertical (z) direction is $$F_{z'} = \frac{G(m_1+m_2)\rho cbh}{\left(\frac{b^2}{4}+h^2\right)} \left[ \frac{x'-a}{\sqrt{(x'-a)^2+\frac{b^2}{4}+h^2}} - \frac{x'}{\sqrt{x'^2+\frac{b^2}{4}+h^2}} \right],$$

where h is the vertical distance between the sensor's vertical coordinate z' and the top edge location $z_0$ of the subsurface volume. h in practice is the sum of the altitude of the aircraft carrying the transducer and the vertical depth of the subsurface volume. If the subsurface volume $\Omega$ has a lower density $\rho$ than the background density $\rho_0$, then the volume $\Omega$ contributes to the lowering of the constant gravitational background $g_0$. This is the origin of gravity anomaly $\Delta g$ $$\Delta g = \frac{F_{z'}}{m_1+m_2} = \frac{G\rho\Omega h}{a\left(\frac{b^2}{4}+h^2\right)} \left[ \frac{x'-a}{\sqrt{(x'-a)^2+\frac{b^2}{4}+h^2}} - \frac{x'}{\sqrt{x'^2+\frac{b^2}{4}+h^2}} \right],$$

where $\rho\Omega$ is the mass of the subsurface porous rock system that produces the anomaly. Additional effects on $\Delta g$ due to subsurface stresses can be described by the change of volume $\Delta\Omega$, which occurs when compression and/or tension is applied to the rock system. The density change $\Delta\rho$ may correlate with the subsurface stresses, i.e., the volume change $\Delta\Omega$. It is therefore possible that $\Delta\Omega$ and $\Delta\rho$ are indicative of subsurface stress changes occurring simultaneously and cooperatively to produce a detectable $\Delta g$.

When the aircraft carrying the transducer is moving with a constant-altitude speed of v, we can write $$x'=x_0=vt,$$

where $x_0<0$ is the initial horizontal position of the transducer. The gravity anomaly $\Delta g$ becomes explicitly dependent on time $$\Delta g(t) = \frac{G\rho\Omega h}{a\left(\frac{b^2}{4}+h^2\right)} \left[ \frac{x_0+vt-a}{\sqrt{(x_0+vt-a)^2+\frac{b^2}{4}+h^2}} - \frac{x_0+vt}{\sqrt{(x_0+vt)^2+\frac{b^2}{4}+h^2}} \right].$$

As the aircraft speed v increases, $F_z(t)$ becomes sharper without affecting its magnitude. Thus, for sufficiently high aircraft speed, the gravity anomaly $\Delta g$ can be described as occurring abruptly at $t\geq\tau$.

The time-dependent gravity anomaly $\Delta g(t)$, possesses an optimum vertical distance given by $$h_{opt}=b/2,$$

where the gravitational field magnitude is maximum, which is obtained by differentiating the function $$f(h) = \frac{h}{\left(\frac{b^2}{4}+h^2\right)}$$

with respect to h, setting it to zero, and solving the resulting equation for optimum vertical distance $h_{opt}$. b is the linear size of the hydrocarbon deposit in the direction perpendicular to the aircraft motion. h in practice is the sum of the altitude of the aircraft carrying the sensor and the vertical depth of the subsurface volume. Given that the aircraft's altitude is typically 3,000 meters, the gravity-based transducer system in this embodiment can detect basin-level hydrocarbon deposits.

The explicit time dependence of $\Delta g$, which is detected by the design, allows for the sensor not to conserve energy. As the sensor flies along a flight line and encounters several $\Delta g$ anomalies, it accumulates mechanical energy from the work done by the $\Delta g$ anomalies $$\text{Work done} = \sum_j \int (m_1+m_2)\Delta g_j d\xi,$$

where $d\xi$ is the relative displacement within the sensor. The integral is performed over one anomaly, while the summation includes all anomalies the sensor encounters along its flight path.

II.3. Discussion

As discussed, the oscillatory components of the relative displacement $\xi(t)$ are omitted in the above mathematical model for demonstrating some fundamental features involved in the transducer operation. Nevertheless, it is important to note that continuous rectilinear motion induces and maintains oscillation of the pin-bead complex of the transducer at their natural frequencies through dynamic interaction with the gravity field. This oscillatory behavior allows the transducer to selectively react to gravity anomalies on a small spatial scale while filtering out the slowly varying gravity background. This oscillatory behavior also allows the accumulation of minute gravity variations through resonance so that recognizable waveform interference for gravity anomalies will be exhibited in the signal.

However, the oscillatory behavior does not allow the transducer to settle down when it is in continuous rectilinear motion. Consequently, on one hand, a high sample rate for data acquisition to follow the evolution of small-scale gravitational patterns can be used without the need for the establishment of the test-mass equilibrium condition; on the other hand, the dynamic detection of gravity anomalies becomes more complex in comparison to the static conventional gravimeters. It is thus necessary to exploit the acquired signal in terms of wave attributes including the trend development of amplitude, frequency, phase, and so on. It is pattern recognition rather than each single point value that is used in data interpretation. This implies that the transducer in this invention trades off measurement accuracy in favor of gaining higher detection sensitivity and efficiency in identifying gravity anomalous areas for potential hydrocarbon deposition.

The transducer of this invention detects gravitational anomalies due to the physical contrast of density and stress between geologic discontinuities and the background. In addition to subsurface density changes, the principal stresses also play a significant role in the development of subsurface conditions associated with discontinuities (cf. J. S. Bell, "In situ stresses in sedimentary rocks—part 2: applications of stress measurements", *Geoscience Canada*, 23, 135-153, 1996). In general, the maximum horizontal stress ($S_{Hmax}$) controls fluid migration and the minimum horizontal stress ($S_{hmin}$) dictates fluid expulsion. As fluid moves into reservoir rocks, $S_{Hmax}$ will decrease and $S_{hmin}$ will increase as pore pressure increases. Reduction of shear and increase in permeability distribution in reservoirs (controlled by $S_{Hmax}$) will lead to a higher subsurface homogeneity condition. Where significant stress changes occur in rocks at fractures and faults or in reservoirs at the edges, they will be accompanied by significant density change. Investigations of gravity gradients and stress changes have shown that there is a physical relationship between the two at small scales (cf. T. J. Hayes et al., "A gravity gradient method for characterizing the post-seismic deformation field for a finite fault", *Geophysical Journal International*, 173, 802-805, 2008).

For the response of the transducer, changes in subsurface homogeneity are fundamental in producing the physical contrast of interest. In general, porous rocks and the presence of fluid cause a decrease in bulk density, which will produce a lower gravitational field. If more fluid is accumulated in a trap with high porosity and effective permeability distribution, then the reservoir system becomes more homogenous. Consequently, there is an increase in spatial subsurface homogeneity. Based on such considerations, a geological background (or non-anomalous) condition can be characterized by a random distribution of $\Delta\rho$ with hydrostatic pressure gradients. An anomalous condition of interest can be characterized by an isolated homogeneous distribution of $\Delta\rho$ due to enhanced porosity and fluid presence typically bounded by abnormal stress gradients. The anomalous condition can also be characterized by a marked reduction in shear stress inside the reservoir and a reorientation of the horizontal principal stresses around it.

The most significant physical contrast that the transducer "sees" is at the onset of the anomaly, which is due to the change in rock properties and the increase in anomalous fluid volume. The negative gravity anomaly produced by the presence of the fluid body will induce a relative displacement of the transducer components and affects the resonance state. As a result, the transducer responds strongly to the edges of the anomaly.

To summarize, in responding to small-scale anomalous conditions in the gravitational acceleration, the embodiment is designed to employ a reduced proof-mass assembly for minimizing inertial effects and to allow high-frequency interaction with the gravity field in a high-altitude and high-speed survey environment, to allow a mechanical instability for enhancing detection sensitivity, to utilize rectilinear motion for continuously accumulating $\Delta g$ necessary to resolve reservoir-scale features, and to obtain wave-based signal patterns through electromechanical transduction for analysis as opposed to the standard magnitude measurement in traditional gravimetry.

In hydrocarbon exploration, the five major criteria assessed are source, migration, trap, reservoir, and seal. The transducer of this invention is capable of reacting to the anomalous density and stress conditions produced by the combined presence of trap, reservoir and seal. Therefore, it can be employed as a powerful gravity-based tool for providing information on areas conducive to fluid entrapment in the sedimentary column.

A feature of one embodiment described is that it includes dynamic signal integration while in motion. All present gravimeters and gravity gradiometers take static measurements, i.e., sensor is not required to be in motion and, therefore, these instruments (1) are incapable of performing a dynamic signal integration or detecting the energy accumulation over time; (2) have no ability to selectively respond to subsurface stress induced energy changes (perturbations from each subsurface discontinuity); (3) are incapable of sampling vibration signals of the gravitational field at a high sample rate (e.g., 2,000 samples per second); and (4) have no ability to identify the presence of localized trapped fluids in the subsurface.

In one embodiment, there is a gravity transducer system comprising: a junction comprising a first metal and a second metal different than the first metal, the junction forming a resonant cavity; a particle characterized by a de Broglie wave, the particle contained within the resonant cavity; a phonon wave within the resonant cavity, the de Broglie wave coupled with the phonon wave; a power source for applying electrical power across the junction; a sensor capable of sensing resistance, voltage, or current, the sensor electrically connected with the junction, the sensor producing a sensed signal; and a recording system for recording the sensed signal. In one alternative, the particle is not held in a lattice structure. In another alternative, the system further comprises an accelerometer. In one alternative, the recording system comprises a geographical positioning system (GPS). In one embodiment, the system further comprises a vehicle capable of moving the transducer system. In one alternative, the vehicle is an airplane. In one alternative the recording system comprises a mapping system for mapping the location of the vehicle. In one embodiment, the junction comprises: a conductive bead having longitudinal bore through it; and a conductive pin having a dielectric coating, the pin located in the longitudinal bore to form the electrical junction. In one alternative, the bead and pin are made of metal, and the dielectric comprises a metal oxide. In one embodiment, the metal oxide comprises silver oxide. In one embodiment, the bead comprises a sandwich comprising a copper or gold layer formed between first and second alloy layers. In another embodiment, the power source is a voltage source and the voltage is between 3 volts and 9 volts.

In another embodiment, there is a method of detecting orientation changes or localized variations of a gravitational field associated with sub-surface stress, the method comprising: creating a resonant cavity; trapping a particle in the resonant cavity; applying an electrical field across the particle in the resonant cavity to create an electrical junction; exposing the junction to the orientation changes or localized variations of a gravitational field; sensing the resistance, voltage, or current across the junction to produce a sensed signal characteristic of the orientation changes or localized variations of a gravitational field associated with sub-surface stress; and recording the sensed signal; and analyzing the signal to detect the orientation changes or localized variations of a gravitational field. In one embodiment, the method further comprises, moving the trapped particle in the resonant cavity through the gravitational field. In one alternative, the moving comprises moving the trapped particle in the resonant cavity in a vehicle. In another embodiment, the moving comprises moving the trapped particle in the resonant cavity in an airplane. In one alternative, the recording comprises recording the sensed signal as a function of time. In another embodiment, the recording comprises recording the sensed signal as a function of geographical position of the trapped particle in the resonant cavity. In one embodiment, the analyzing comprises analyzing the signal amplitude, signal frequency, or signal character and pattern of the signal.

In another embodiment, there is a method of detecting a hydrocarbon deposit, the method comprising: providing a gravity transducer for sensing a change in a gravity field; moving the gravity transducer through the atmosphere or on land above the hydrocarbon deposit; sensing a change in the gravity field to produce a gravity change signal indicative of the hydrocarbon deposit; recording the gravity change signal; and analyzing the gravity change signal to detect the hydrocarbon deposit. In one alternative, the moving is performed by placing the gravity transducer in a vehicle and moving the vehicle. In one embodiment, the method further comprises tracking the position of the vehicle and the recording comprises recording the position of the vehicle. In one alternative, the analyzing comprises correlating the recorded gravity change signal with the position of the vehicle. In one embodiment, the moving comprises placing the transducer in an aircraft and flying the aircraft over the deposit. In one embodiment, the method further comprises tracking the geographical position of the aircraft and recording the tracked position. In another embodiment, the method further comprises displaying the real time position of the aircraft. In another embodiment, the displaying comprises displaying a planned flight line and deviations from the flight line. In another embodiment, the displaying comprises displaying the planned flight line and the deviations on the windshield of the aircraft. In another embodiment, the method further comprises monitoring rotation of the aircraft along a horizontal plane to provide a rotation signal, the recording comprises recording of the rotation signal, and the analyzing comprises using the rotation signal to improve the quality of the gravity change signal. In one embodiment, the flying comprises flying the aircraft at an altitude of between 1,000 feet and 20,000 feet. In another embodiment, the method comprises integrating the gravity change signal dynamically over time. In another embodiment, the method further comprises detecting the energy accumulation in the signal over time. In another embodiment, the signal is sampled at a sample rate of 1,000 samples per second or more.

There is also a method of detecting a subterranean fluid trapped beneath a layer of earth, the method comprising: providing a subterranean fluid transducer capable of detecting the trapped subterranean fluid; moving the transducer through the atmosphere or on land above the trapped fluid; sensing the trapped fluid to produce a trapped fluid signal indicative of the trapped fluid; recording the trapped fluid signal; and analyzing the trapped fluid signal to detect the trapped fluid. In one embodiment, the moving is performed by placing the transducer in a vehicle and moving the vehicle. In another embodiment, the moving comprises placing the transducer in an aircraft and flying the aircraft over the deposit. In another embodiment, the method further comprises tracking the geographical position of the aircraft and recording the tracked position. In another embodiment, the method further comprises monitoring rotation of the aircraft along a horizontal plane to provide a rotation signal, the recording comprises recording of the rotation signal, and the analyzing comprises using the rotation signal to improve the quality of the gravity change signal. In another embodiment, the flying comprises flying the aircraft at an altitude of between 1,000 feet and 20,000 feet. In one embodiment, the trapped fluid is a hydrocarbon.

In another embodiment the invention provides: a gravity transducer system comprising: a junction comprising a first metal and a second metal, said junction forming a resonant cavity due to the mechanical vibration of the pin-bead assembly; a power source for applying electrical power across said junction; a sensor capable of sensing resistance, voltage, or current, said sensor electrically connected with said junction, said sensor producing a sensed signal; and a recording system for recording said sensed signal. In one embodiment, the gravity transducer further comprises an airplane capable of moving said transducer system in a rectilinear motion. In another embodiment, the junction comprises: a conductive bead having longitudinal bore through it; and a conductive pin having a dielectric coating, said pin located in said longitudinal bore to form said electrical junction. In another embodiment, there is a pin-bead assembly capable of producing relative displacement between said bead and said pin under said rectilinear motion of said aircraft. In another embodiment, the bead and pin are made of metal, and said dielectric comprises a metal oxide. In another embodiment, there is an oxide layer between the pin and bead, which oxide layer comprises silver oxide, copper oxide or other metal oxide. In another embodiment, the bead comprises a sandwich structure comprising a copper or gold layer formed between first and second alloy layers. In another embodiment, the power source is a voltage source and the voltage is between 3 volts and 9 volts.

The invention also provides a method of detecting orientation changes or localized variations of gravitational field associated with density changes and subsurface stresses, the method comprising: creating a resonant cavity due to the mechanical vibration of the pin-bead assembly, the mechanical vibration representing relative displacement between the bead and the pin; applying an electrical field across the junction in the resonant cavity to create an electrical junction; exposing the junction to the orientation changes or localized variations of a gravitational field via the relative displacement between the bead and the pin; sensing the voltage across the junction to produce sensed signal characteristics of the orientation changes or localized variations of a gravitational field; acquiring the orientation changes or localized variations of a gravitational field continuously from a moving airplane without the need for establishing a static equilibrium state; using mechanical instability for enhancing detection sensitivity and survey efficiency; exploiting high-altitude, high-speed interaction with a gravitational field, allowing small oscillating test masses to have access to high-frequency domains of the gravitational field; acting as a mechanical transducer to rapidly respond and convert the displacement energy into electrostatic charge distribution, and as a capacitance transducer to modulate the output through integration; recording the sensed signal; and analyzing the signal to detect the orientation changes or localized variations of a gravitational field associated with sub-surface stress changes or density changes. In one embodiment, the recording comprises recording the sensed signal as a function of time.

In another embodiment, there is a gravity transducer system comprising: a junction comprising a first metal and a second metal, the junction forming an active capacitance due to the mechanical vibration of the junction assembly; a power source for applying electrical power across the junction; a sensor capable of sensing voltage, the sensor electrically connected with the junction, the sensor producing a sensed signal characteristic of a gravitational signal; and a recording system for recording the sensed gravitational signal. In one embodiment, the system further comprises a vehicle capable of moving the transducer system in a rectilinear motion. In an alternative embodiment, the junction comprises: a conductive bead having longitudinal bore through it; a conductive pin having a dielectric coating, the pin located in the longitudinal bore to form the electrical junction; and a dielectric polymer spacer between the bead and the pin. In one embodiment, the pin and bead are made of metal, and the dielectric coating comprises a metal oxide. In one embodiment of the gravity transducer system, there is an oxide layer between the pin and the bead and the oxide layer comprises silver oxide, copper oxide or other metal oxides. In one embodiment, the bead comprises a sandwich structure comprising a copper or gold layer formed between a first alloy layer and a second alloy layer. In one embodiment, the power source is a voltage source and the voltage is between 3 volts and 9 volts. In one embodiment, the gravity transducer system acts as a mechanical transducer that responds in-situ during aerial survey, converts the mechanical displacement energy into electrostatic charge, and a capacitance transducer that creates a voltage in relation to the gravity change. In one embodiment, the gravity transducer system responds only to small-scale gravity anomalies and rejects slowly varying gravitational trends including topographical effects though resonance or synchronous deflection of the transducer elements.

There is also a method of detecting orientation changes or localized variations of gravitational field associated with changes in density and subsurface stress, the method comprising: creating a junction of two dissimilar metals applying an electrical field across the junction; exposing the junction to the orientation changes or localized variations of a gravitational field; sensing the voltage across the junction to produce a sensed signal characteristic of the orientation changes or localized variations of a gravitational field; recording the sensed signal as a function of time; and analyzing the signal to detect the orientation changes or localized variations of a gravitational field associated with the subsurface density and stress changes. In one embodiment, creating a junction comprises forming an adjustable resonant cavity having a trapped particle characterized by a de Broglie wave coupling with a phonon wave. In one embodiment, creating a junction comprises forming a pin-bead assembly capable of relative displacement between the pin and bead to produce an active capacitance due to the mechanical vibration of the pin-bead assembly. In one embodiment, the method further comprises flying the junction in rectilinear motion in an aircraft. In one embodiment, the analyzing comprises analyzing signal attributes including amplitude, frequency, character, pattern, sequence, and trend.

There is also a method of detecting fluid entrapment including a hydrocarbon deposit, the method comprising: providing a gravity transducer relying on the adjustable resonant cavity or relative displacement between a pin and a bead for sensing a change in a gravitational field; moving the gravity transducer through the atmosphere or on land above the hydrocarbon deposit in a continuous rectilinear motion; interacting dynamically with and sensing a change in the gravitational field through electromechanical conversion through the electrical junction to produce a voltage signal indicative of the hydrocarbon deposit; eliminating constant background gravitational field through the resonant cavity or relative displacement; recording the gravity change signal at 2,000 samples per second; and analyzing the gravity change signal to detect the hydrocarbon deposit. In one embodiment, the moving comprises flying the gravity transducer in an aircraft at an altitude up to 3,000 meters at a speed up to 500 km/h. In one embodiment, there is an optimum altitude as a function of the size of the hydrocarbon deposit. In one embodiment, the method further comprises integrating the gravity change signal, detecting and modulating the energy accumulation dynamically over time.

In one embodiment, there is a gravity transducer system for acquiring continuous gravity changes from any of the above methods by exploiting high-altitude, high-speed interaction with the gravitational field using small oscillating masses to access high-frequency domains of the field. In one embodiment, the gravity transducer system uses differential data acquisition to eliminate the need for any background gravitational acceleration reference.

The invention also provides a method of detecting hydrocarbon deposit, the method comprising: providing a gravity transducer relying on the relative displacement between the bead and the pin for sensing a change in a gravitational field; moving the gravity transducer through the atmosphere or on land above the hydrocarbon deposit in a rectilinear motion; sensing a change in the gravitational field through electromechanical conversion through the electrical junction to produce a voltage signal indicative of the hydrocarbon deposit; eliminating constant background gravitational field through the relative displacement; recording the gravity change signal; exploiting wave-based detection patterns as opposed to standard magnitude measurement; and analyzing the gravity change signal to detect the hydrocarbon deposit. In one embodiment, the flying comprises flying the aircraft at an altitude up to 3,000 meters. In another embodiment, the altitude is a function of the size of the hydrocarbon deposit.

There has been described a practical gravitational detector, which detector is stable, compact, rugged and can be operated at room temperature.

Any of the parts of any one of the embodiments described herein may be combined with any of the parts of any of the other embodiments. Equivalent structures and processes may be substituted for the various structures and processes described; the sub-processes of the inventive method may, in some instances, be performed in a different order; or a variety of different materials and elements may be used. Consequently, the invention is to be construed as embracing each and every novel feature and novel combination of features present in and/or possessed by the gravity transducer apparatus and methods described.

III. Examples of Hydrocarbon Sensing Results

To verify that the system according to the invention works, flights were made over several distinct potential hydrocarbon locations and the results compared to previous knowledge of the fields. The first of these fields is the Canadian onshore carbonate field referred to as the Ladyfern Gas Field, in BC, Canada. Found in 2000, the Ladyfern field was estimated to contain 1.5 Tcf of natural gas reserves. Three flight lines were flown in different directions to confirm the relation of porous areas to the sensor signal. The Ladyfern gas field is enclosed within a carbonate barrier reef with porosity preserved through the process of leaching and dolomitization. Faults and fracture systems on the boundaries are strike-slip in nature. Based only on seismic, the dolomitization and trapping is not readily visible, although the sag features are quite clear.

Ladyfern is a natural gas accumulation hosted in a stratigraphic trap—Devonian slave point reef. The productive reservoir facies have developed via burial digenesis called hydrothermal dolomitization ("HTD"). Splays and antithetic faults associated with the nearby Hay River dextral transform system are believed to have acted as conduits for the hydrothermal fluids. The aggressive nature of HTD digenesis has created a series of 'sag' or 'collapse' features in and around the reef, which are readily visible via seismic studies.

Figure 11:
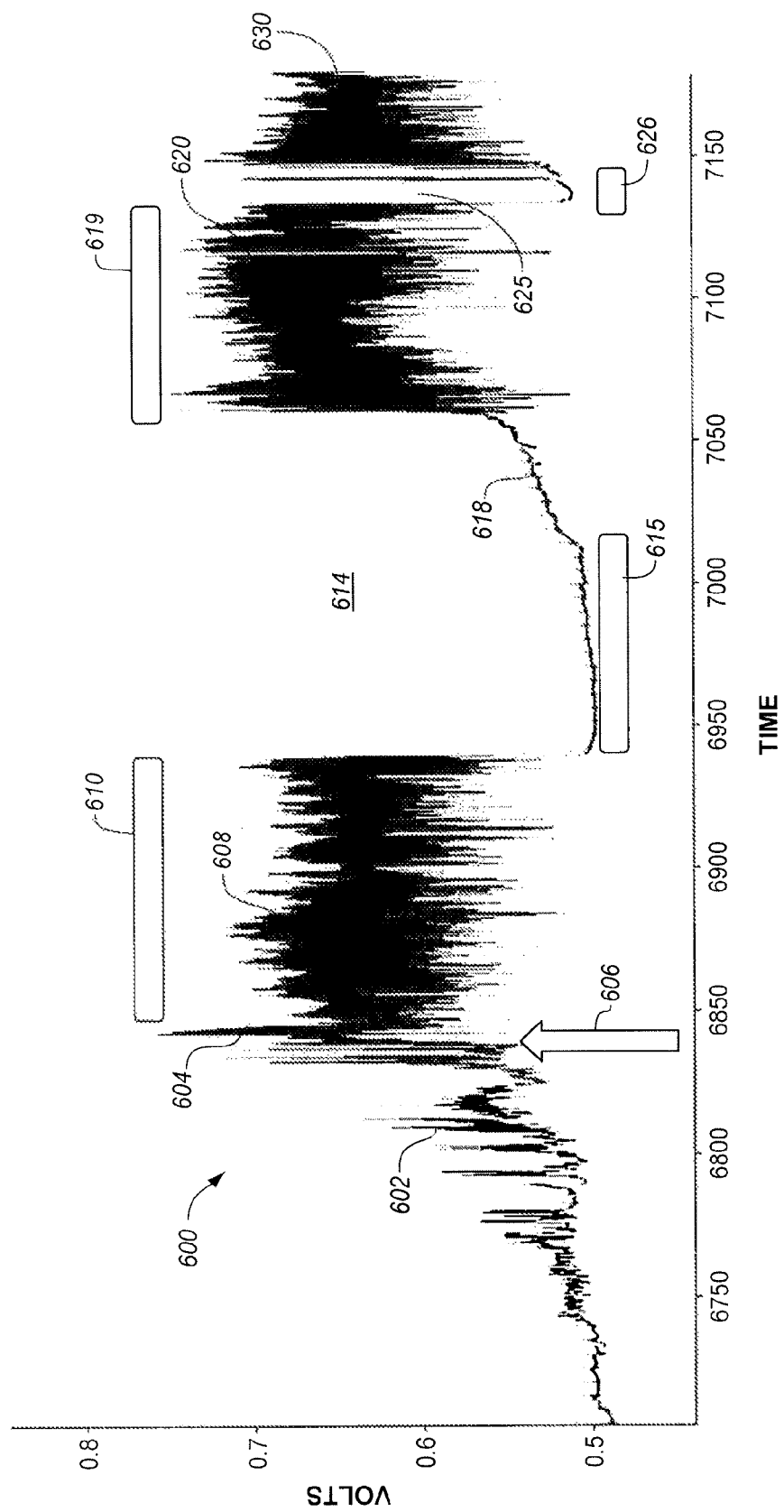
FIGS. 11-13 illustrate examples of signals generated by the system of FIGS. 2 through 6B on test flights that verify the abilities of the system, and more specifically.
Figure 12:
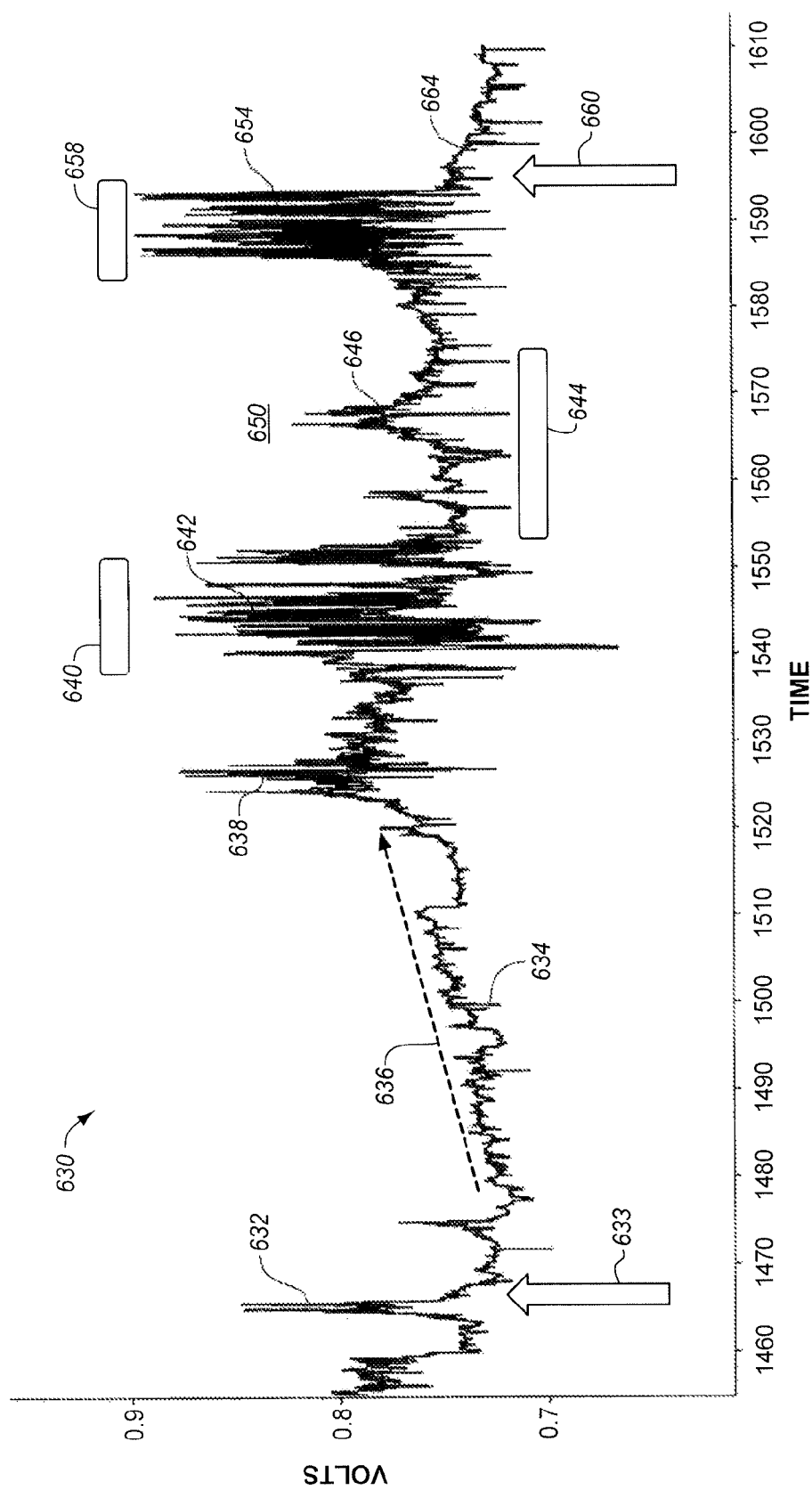
Figure 13:
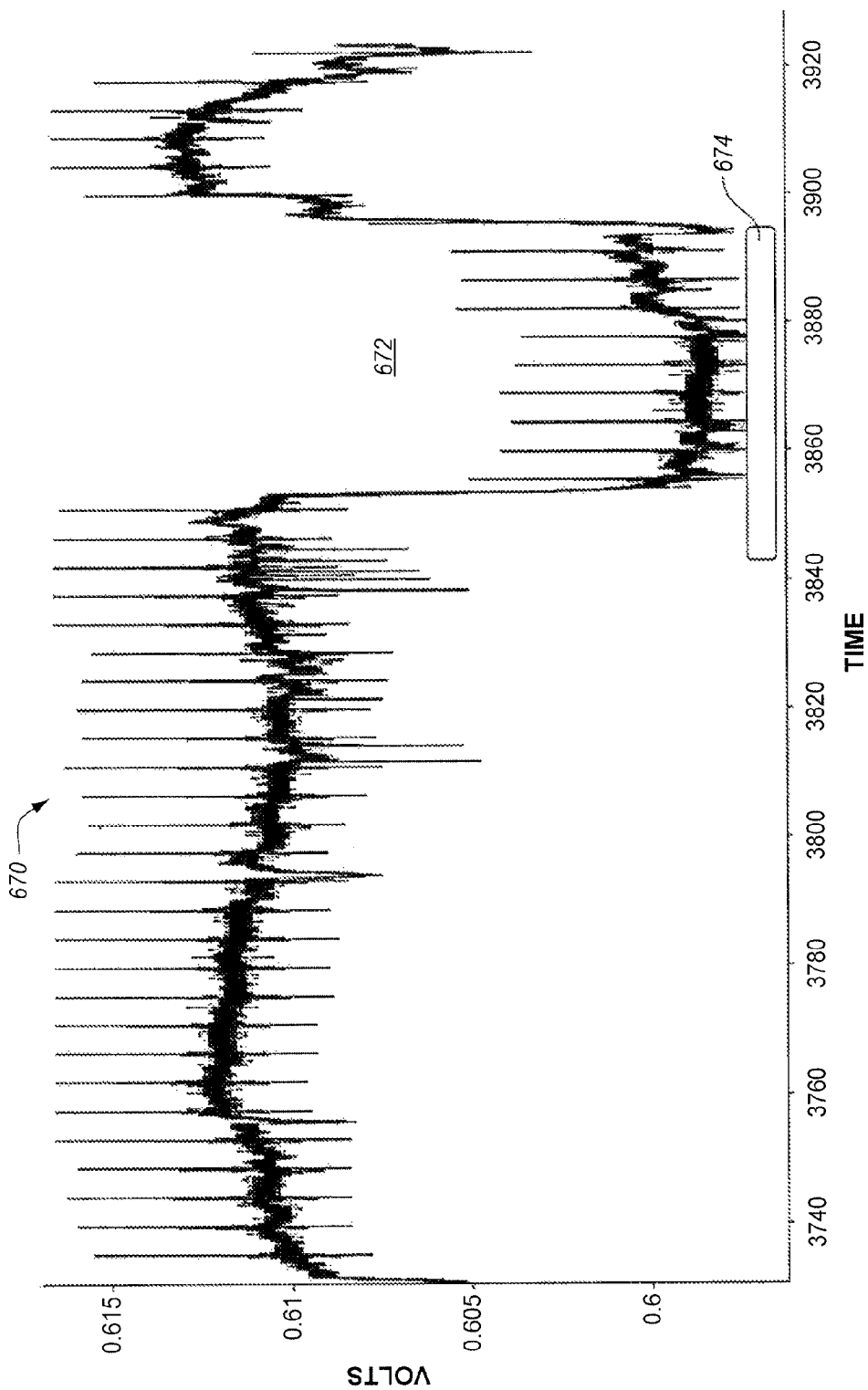

FIGS. 11-13 show the sensor signals obtained from two flights flown over the Ladyfern field and one flight flown over the Burnt Timber gas field, AB, Canada. Each of FIGS. 11 through 13 shows signal output in volts versus flight time. The output voltage is normalized to fall between zero and 1 volt. The resultant sensor signals indicate sub-surface geological changes and anomalies which are indicators of potential hydrocarbon bearing reservoirs. A very strong correlation to the distribution of the trapped reservoir was found. In this field, it was difficult to identify the carbonate pockets using only seismic, and the sensing system described herein provided a good corroboration of reservoir opportunities.

FIG. 11 shows a sensor signal 600 developed along a maximum stress line over the British Columbia plains. At 602 the signal begins to rise showing an approaching geological change. Sharp peaks at 604 indicate stress fractures and a geologic change indicated at arrow 606. The curve can best be understood by viewing it as a whole. It is seen that there is a strong anomaly at 614 bracketed by similar signals 608 and 620 on either side. Following the interpretation guidelines discussed below, we interpret this as a hydrocarbon reserve in the area 615 with typical approaches at 610 and 619. At 618 the signal shows the rise out of the anomaly. The area 615 corresponds to an area of drilled wells. We also can see a minor anomaly at 625 indicated by the bar 626. This is an undrilled area. At 630, we see the decline of the signal indicating the plane is leaving the anomalous area.

FIG. 12 is a signal 630 developed with the same sensor as used in FIG. 11, but in the foothills of the Rocky Mountains and also along the maximum stress line. Here a geological change is indicated by the sharp peak at 632, which is marked by the arrow 633. The signal begins to rise at 634 along the direction 636. The bracketing structures are at 642 and 654 in the areas 640 and 658, respectfully. An anomaly 650 is indicated by the dip in the signal at 646 in the area 644. The signal falls off at 664 indicating a geological change indicated by arrow 660. Overall, this signal is much more fractured, such as shown at 638 and 646 which indicate that the terrain is more fractured.

FIG. 13 is a signal 670 developed over the same anomaly as the anomaly 614 of FIG. 11, except along the line of minimum stress. The same anomaly shows up at 672 in the area 674.

Figure 14:
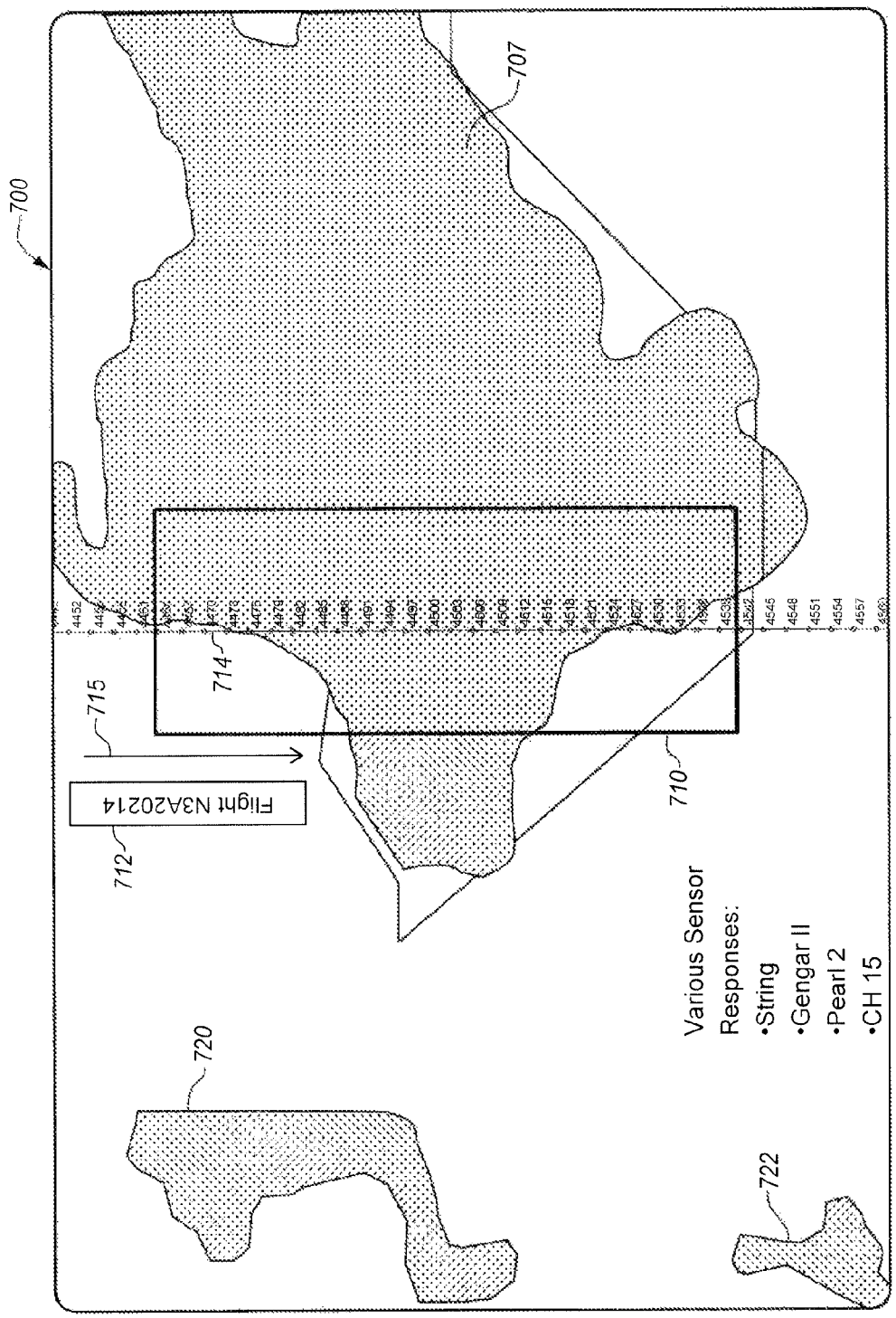
FIG. 14 shows a survey flight line map for a flight on Apr. 14, 2012 over the La Jarilla oil field in Comodoro-Rivadiva, Argentina.
Figure 15:
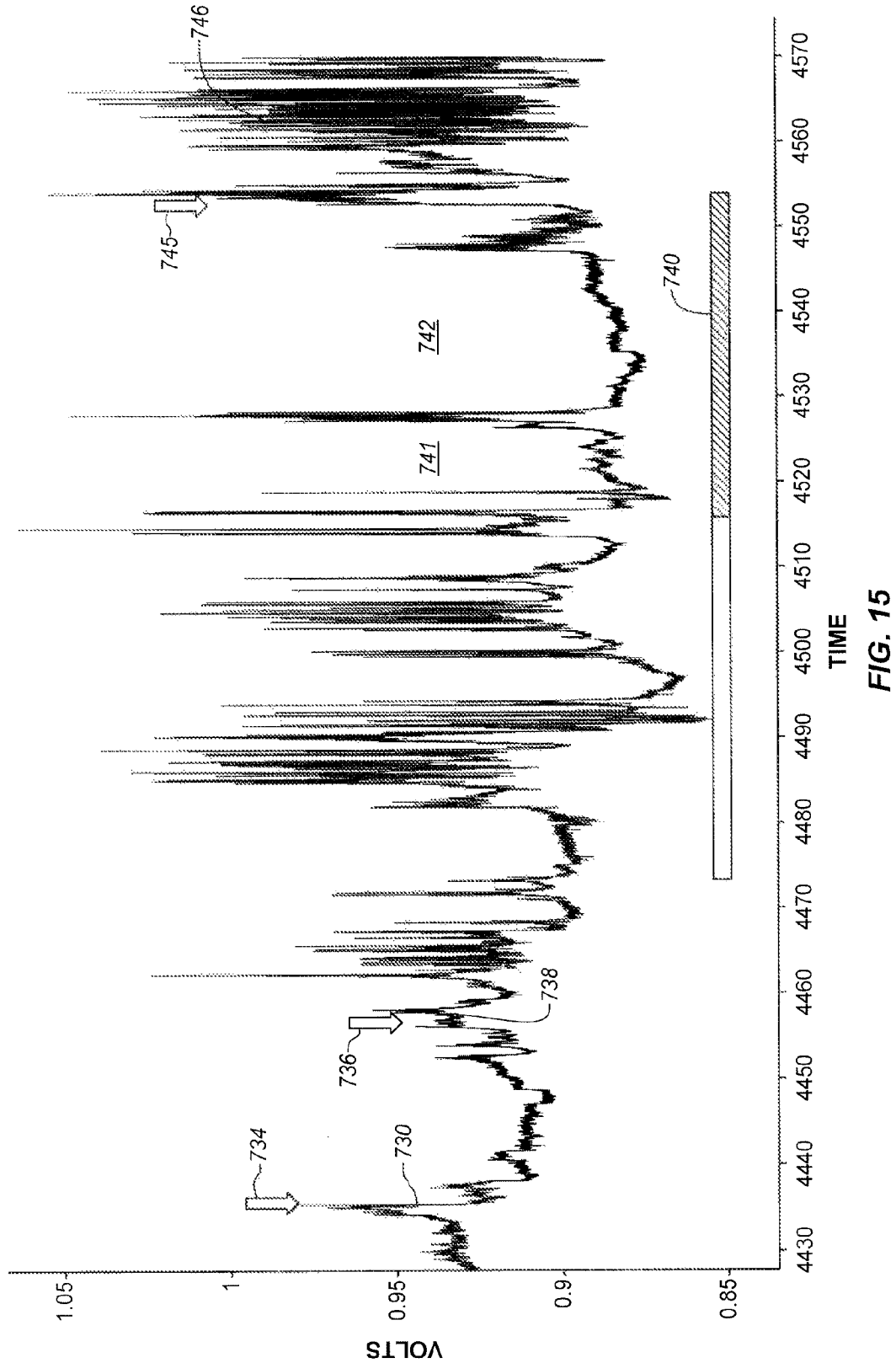
FIG. 15 shows a signal developed along the flight line of FIG. 14 taken off of sensor "Pearl"
Figure 16:
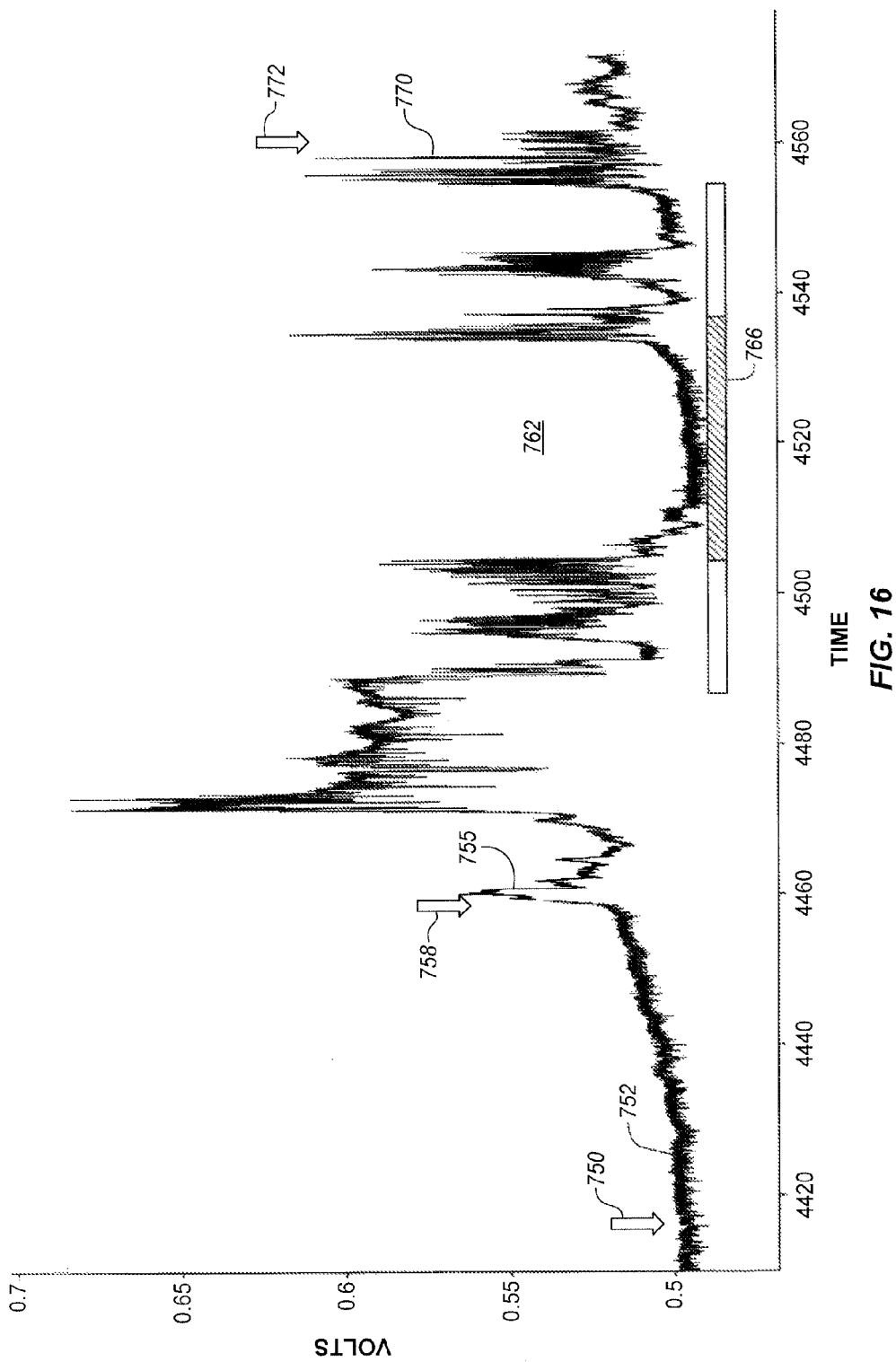
FIG. 16 shows another signal developed along the flight line of FIG. 14 taken off of sensor "String", a different sensor from sensor "Pearl"

FIGS. 14, 15 and 16 show signals developed in an R&D test flight over the "La Jarilla" oil field in Comodoro-Rivadiva, Argentina. This particular series is shown to illustrate that different sensors will not show identical signals. FIG. 14 shows the display 700 as shown by the mapping computer 216. Display 700 shows the "La Jarilla" field at 707 and several smaller fields at 720 and 722. The flight identification number is shown at 712 and the flight direction is shown at 714. The area surveyed is shown at 710, and the time line is shown at 714. FIGS. 15 and 16 show the same area and time covered, but with different sensors. Comparing FIGS. 15 and 16, it is seen that a local geological change 734 in FIGS. 15 and 750 in FIG. 16 and the start of an anomalous area show up differently. In FIG. 15, it is indicted by a sharp peak at 730, and in FIG. 16, it is indicated by a signal buildup at 752. A local geological change 736 in FIGS. 15 and 758 in FIG. 16, show up similarly as minor peaks 738 in FIGS. 15 and 755 in FIG. 16. The anomaly is shown by a dip at 741 and 742 in area 766 FIG. 15 and a single dip at 762 at area 740 in FIG. 16. The end of the anomalous area is shown at 746 in FIG. 15 by a frequency change and amplitude shift. This is also shown by a frequency change and amplitude shift at 770 in FIG. 16, though the change is not as pronounced. These curves show that what is important is the changes in the signals, not the absolute values of the signals. This will be made clearer in the signal interpretation section below.

IV. Operation of the System

IV.1. Aircraft Tracking and Communication Systems

The aircraft tracking and communication systems consist of two parts. The first part is a "flight-path following system" that provides the capability for the recording operator in the aircraft and the ground crew to follow the flight path and ensure the aircraft is on its intended course. The system updates the position of the aircraft each minute. This ensures that the ground crew has access to the plane's location with a high degree of accuracy. The main purpose of the tracking system is to conduct safe flights and to allow the R&D engineers, and, in the future, potential clients, government and military agencies to track the aircraft accurately during the survey flights. The system is satellite-based through the iridium network which enables global access to position data and enables voice and data communications outside of cellular coverage areas.

The second tracking system is connected to the GPS navigation and gives a real-time-map based update to the sensor operator who is monitoring the on-board quality control system. The onboard Novatel GPS System is supplemented by a subscription service to Omnistar for wide area differential GPS Corrections. This setup provides a very high degree of data positioning accuracy within +/−2 meters.

IV.2. Data Recording Systems

Two computer systems are used to record the data independently and simultaneously: the QNX system with 16-bit precision and the WinDaq system with 14-bit precision. All systems are controlled via the main QNX computer. Specifically, the QNX computer maintains automatic synchronization of the redundant data acquisition by automatically signaling the start and stop of recording within 0.5 seconds. Furthermore, the QNX computer also records the GPS position and elevation information, visual ground references and any other relevant in-flight data required for proper quality control at the end of the flight. GPS elevation data is utilized along with USGS-provided DEM data at the end of the flight to calculate the height of the plane above ground. This ensures that the flight, preferably done at 10,000 feet, was conducted within the altitude tolerance limits of the sensors. However, flights can be conducted within a range of 1,000 feet and 20,000 feet.

IV.3. Data Quality Control Systems

The quality control system incorporates the raw digital output from QNX and the graphical display of the output from the WinDaq acquisition system. Since this is similar to the signal that is used for interpretation, determination of the quality of the signal can be made in-flight. The result from the real-time GPS output and the planned fight are compared to ensure a minimal deviation. The cross track, an indicator of how far off the planned course the aircraft is located, is monitored in real time during the flight both by the operator and the pilots. Normally, a cross track distance within 10 meters is maintained.

In addition, the quality control system contains power supply monitors to ensure the maintenance of proper voltage levels throughout the data acquisition process. Accelerometers are also used to monitor the acceleration of the aircraft on the vertical and two horizontal axes during the data acquisition process.

IV.4. Data Post-Processing Systems

At the end of the flight, the QNX system automatically transfers all data onto an external disk. The raw data is checked to ensure the correct record lengths. In particular, the data is checked to ensure that both QNX and WinDaq acquisition systems have recorded the raw data with no problems.

The raw data in hexadecimal format is processed to check for consistency of data and is then reformatted for input into the DADiSP engineering worksheet. DADiSP is a commercial interactive graphics worksheet, a visually oriented software package for the display, management, analysis and presentation of scientific and technical data. It can be used to manipulate, edit, reduce, transform, display and analyze technical data. DADiSP can handle and simplify the large volumes of data output by the sensor system. As mentioned above, digitized sensor output contains 2,000 points per second and flights can average about 10,000 seconds, resulting in a 1 GB per flight data volume or more in a raw form. Once the data is loaded into DADiSP, it may average more than 6 GB per flight. This large volume of data from two recording systems can be handled by DADiSP in an efficient manner.

IV.5. Flight-Planning Process

The overall sensor survey flight planning process starts by researching and understanding the following:

1) Maps—topographic and aviation maps of the target area are prepared in both paper and digital forms.
2) Sensor technology requirements—certain parameters must be followed to obtain reliable, quality data. These include long straight segments, large turning radius and low turbulence. As a rule of thumb, in one embodiment, the minimum straight length is 100 km, the minimum turning radius is 25 km, and the acceleration is not greater than 1 g.
3) Base of operations for the aircraft—selected based on the following criteria: proximity to the survey area, runway length (minimum 5,000 feet), fuel availability (jet A1 with Prist), flight planning facilities, security, accommodations and communications facilities.
4) Other flight restrictions—these include both regulatory agency and geographic considerations as follows:
   Air traffic control rules that include departure and entry vectors, permit approval processes and IFR flight rules.
   Air Force permits required for restricted and prohibited air space.
   Military restrictions that include hostile regions, border buffer zones, and altitude restrictions.
   Geographic restrictions including mountains and borders.
   Prevailing weather trends including precipitation, winds, storms, and clouds.

The above information is utilized to begin designing each individual target flight line. Flight lines are designed as a sequence of straight segment waypoints and accurately controlled turn waypoints.

In one embodiment, to get ready to fly, there are six processes that are performed:

1) The waypoints are loaded into the aircraft's flight management system. This system guides the aircrafts autopilot mode over the planned route to a high degree of accuracy.
2) The waypoints also are loaded into the sensor flight tacking system. This enables the onboard sensor operator to track the progress of the aircraft to ensure that the correct flight path is followed. This system also provides accurate location information for the data that is being collected.
3) Sensors are loaded onto the aircraft and calibrated.
4) Pilots file the flight plan with the relevant administration of air traffic control.
5) Pilots and the sensor operator board the aircraft and perform the planned flight.
6) After completing the flight, the data then is evaluated to ensure that it meets the prescribed quality standards.

In this process, it is important to realize that gradual changes in altitude (in the vertical direction) do not affect the sensors adversely; however, a slight aircraft rotation along the horizontal plane does. The noise inherent within the sensor signal largely originates from rotational aircraft movements.

IV.6. Data Interpretation Process

The sensor signal interpretation process is generally performed at the head office, and in one embodiment, involves three major steps. The first step is the single line sensor by sensor interpretation. This is followed by the multiline sensor signal integration. Then the results go through a final ranking and mapping.

The identification and characterization of sensor signals is the end goal of the sensor interpretation process. The process of sensor signal interpretation involves the recognition the anomalous patterns within the waveform of a sensor signal from its background. The key challenge is to recognize a section of anomalous changes in signal character from a noisy background signal with confidence. Sensor signal interpretation employs several methods to improve the ability to identify an anomaly including spatial confirmation of anomalies across multiple sensors, recognition of the specific sequence of signal character changes, and independent identification of anomalies by multiple teams. For interpretation purposes the signal is continuously recorded from the beginning of a stable flight path until just before landing. In one embodiment, it is important to the interpretation process to capture the relative changes in the "baseline" signal characteristics for each sensor over the entire flight. This enables the recognition of the normal background waveforms and the specific pattern or mode changes.

For a potential anomaly to be subject to interpretation it should show up on a plurality of sensors. The use of multiple sensors plays a significant role in quality control. For a potential anomaly to become further analyzed, it has to be independently located in the same spatial location by at least two separate teams of interpreters. Additionally, in all instances, it needs to occur in a specific sequence.

A key part of the interpretation process is the recognition of the trends and character changes of the background signal and the identification of the sensor "mode". A mode is a long term signal trend which is recognizable for a particular sensor.

A sensor signal character is considered anomalous over an area when it conforms to an idealized pattern or sequence of responses that are known to correlate to geologic changes in the subsurface. These changes include the development of fluid charged reservoir or the existence of structural or stratigraphic trapping mechanisms. Although the sensor signal can indicate the presence of trapped fluid, it currently cannot distinguish between hydrocarbons and water.

Anomalies can exist as point changes in the signal patterns and are often indicative of a significant change in geology. Area anomalies consist of signal changes with a defined beginning and end and will have a recognizable shape, sequence, character change or pattern. Anomalies in the gravity sensor signal are often recognized by frequency changes over different rolling window sizes, trend changes over different window lengths, and magnitude and slope changes over an area.

The correct recognition of "changes" is an intricate process. Fundamentally, the process is complicated by the existence of several background modes of each sensor. The anomaly character development will depend on the background mode. Additionally, the character in the signal is relative; that is, the initial conditions will affect the subsequent sensor responses. For example, crossing a large fault can mask a smaller anomaly that closely follows it.

The output of the data sensor interpretation process is a prospectivity map, which shows recommendation boxes that describe the spatial extent of the reservoir portion of the geological anomaly within the area of the sensor survey.

The following section covering FIGS. 17 through 24 is a basic description of the most important concepts involved in SFD data interpretation using ideal or near-ideal sensor response examples. Each of FIGS. 17 through 24 shows the signal voltage on the ordinate as a function of time along the abscissa. This description is intended to introduce one skilled in the art to the sensor data interpretation process. The most common anomaly attributes and sequences are presented. All major anomalies may be identified by one of the following generalized interpretation concepts, and many less significant anomalies may be identified by either an extension, corollary or grouping of these concepts. Because sensors may exhibit stochastic behaviour, this description may not apply to all sensors. This description focuses on the concepts applicable to a few of the primary sensors. The concepts can be extended with some variations to other sensors. However, it should be understood that it may be advisable to learn the response of each sensor individually by empiric data. Many subtle variations of these examples exist which may or may not alter the anomaly identification. To serve the above purpose, the emphasis of this document will be placed on the detailed visual inspection of the waveforms, although various signal processing techniques may be applied in the interpretation process.

IV.6.1. Signal Attributes Used in SFD Interpretation

The following signal attributes are utilized in this disclosure for a majority of the interpretation process: Signal amplitude; Signal frequency; Signal character and pattern. The current representation of the SFD sensor output is a simple 2D voltage-versus-time plot, which therefore implies that each of the above mentioned attributes can be represented by a particular behavior of the sensor voltage output as a function of time. This section of the document therefore attempts to describe each of these as applicable to the SFD interpretation process. It is important to note that SFD attributes are not defined in absolutes. Each of the following terms/attributes refers to a sequence observed over a floating time period, nominally of the order of 10-50 seconds.

IV.6.1.1. Amplitude

Figure 17:
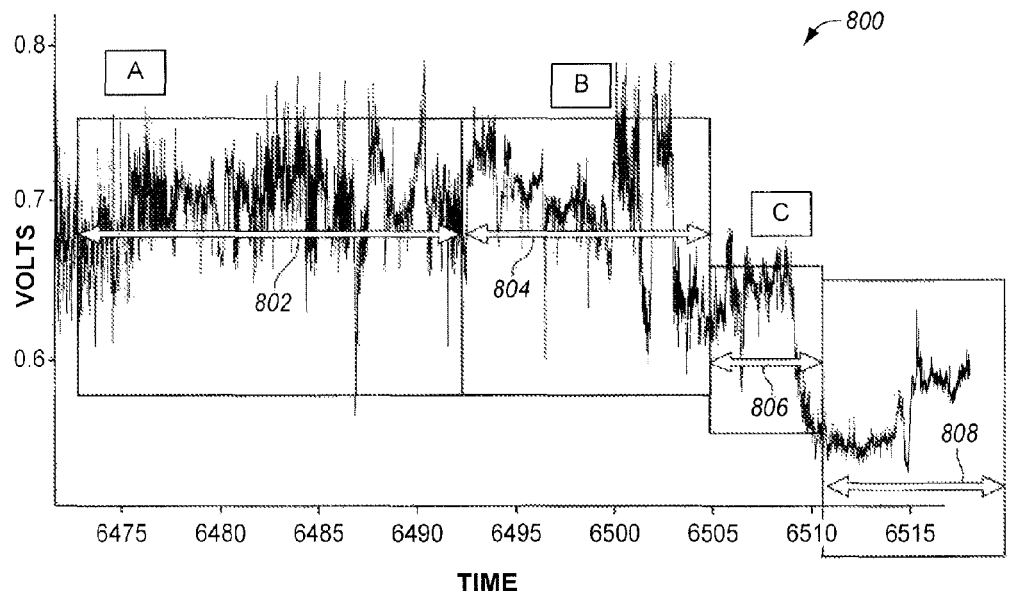
FIG. 17 is a sensor signal illustrating the concept of "signal amplitude"
Figure 18:
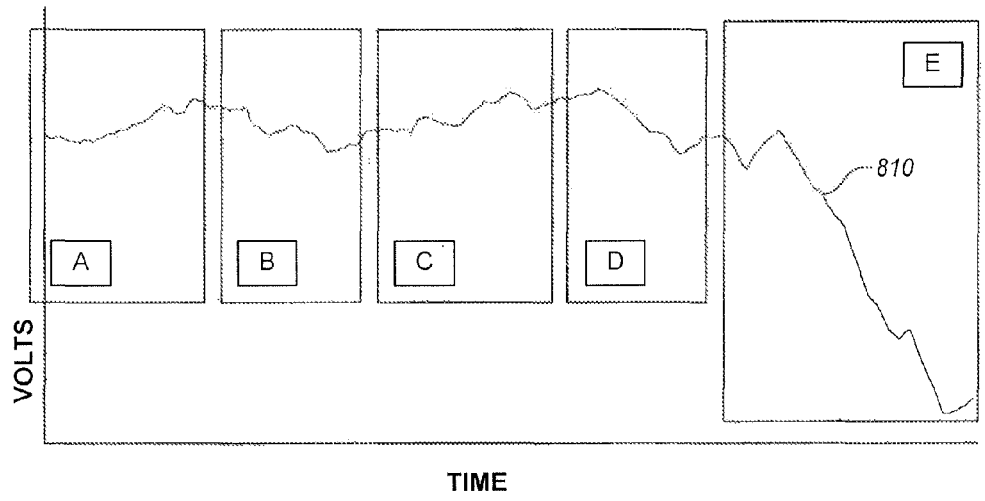
FIG. 18 is a sensor signal in which the amplitude is averaged.

The term "amplitude" as applied to SFD implies a change in the observed mean output voltage of the SFD sensor during a certain interval. There is no fixed definition of the time interval being used to define the mean output voltage nor is it required that the time intervals be of equal duration. FIG. 17 highlights the output voltages and their perceived mean values in a series of time intervals. In sections A and B the mean values shown by arrows 802 and 803 do not appear to have changed; however the two areas may be distinguished on the basis of the remaining signal attributes: frequency and character. In Section C the amplitude shown by arrow 806 has changed. This section may be classified as a transition period from A and B to D. The term amplitude, and quantities and concepts derived from it such as amplitude change, voltage baseline etc., would therefore refer to the voltage value represented by the arrows 802, 804, 806 and 808 which are 0.7V in sections A and B, 0.65V in area C and 0.55V in area D, as opposed to the discrete time amplitude value such as 0.69V at timestamp 6475. Amplitude and Amplitude trends are therefore directly realized by the mean magnitude of the signal voltage in any given time window and play an important role in the identification and ranking of the anomaly. With reference to the previous example shown in FIG. 17, calculating a moving average using 5 second time intervals over the same signal duration yields the curve 810 of FIG. 18. While such a moving average is useful in identifying the major trend intervals, in D and E it tends to obscure the trend of the baseline voltages within the time window. These trends often play a role in determining the ranking of the SFD anomalies. Thus, in this embodiment, moving averages are not the best way to analyze the data.

Figure 19:
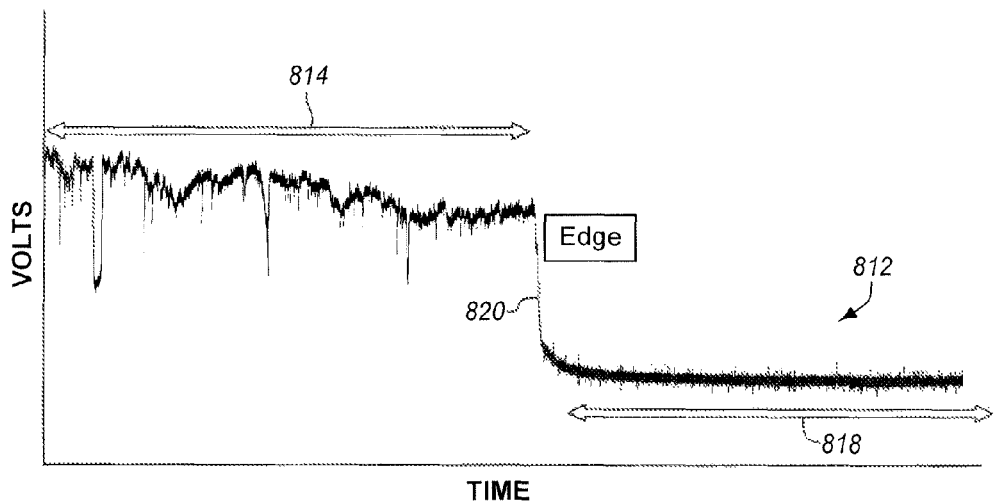
FIG. 19 is a sensor signal illustrating the concept of a geologic edge.
Figure 20:
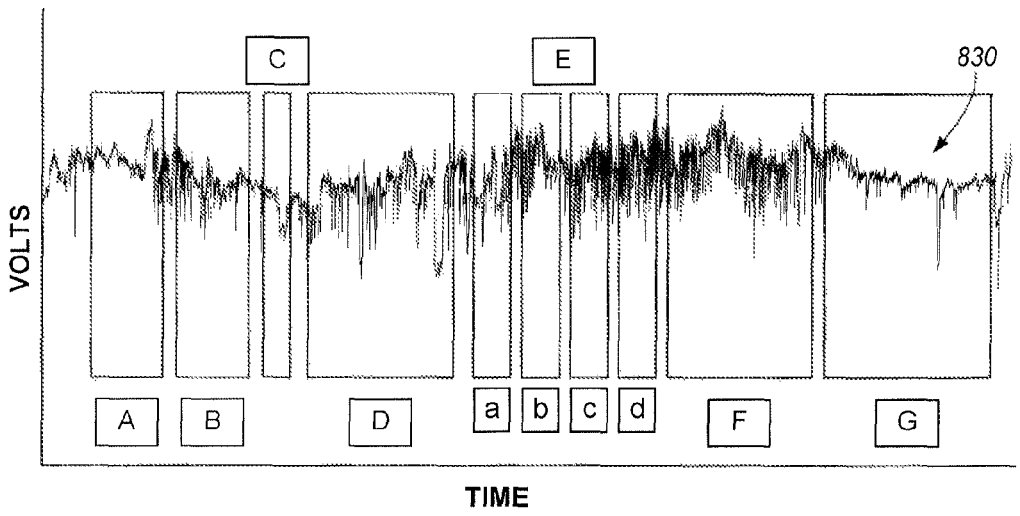
FIG. 20 is a sensor signal illustrating the concept of signal "frequency"

FIG. 19 shows an example of an edge 820 on a SFD signal 812. The edge is an example of a sudden amplitude change between a first area 814 and a second area 818 and it may or may not be accompanied by a mode/background pattern change. An edge is often used to interpret the transition of the sensor from one setting to another. Identification of these points is generally used to determine the start/end of signal sequences that are used to define anomalies.

IV.6.1.2. Frequency

The term "frequency" as applied to SFD implies the number of observed significant peak-to-peak ($V_{max}$-$V_{min}$) values during a certain time interval. The significance is determined based on the comparison with the waveforms prior to and after the time interval of interest. There is no fixed definition of the time interval being used to define the mean output voltage nor is it required that the time intervals be of equal duration. In most cases an identified frequency change or shift will need to be a length longer than 10 seconds (based on the current flying speed of the aircraft) to be considered applicable for SFD interpretation purposes. Consider signal 830 in FIG. 20. The areas A and F will fit the definition of the high frequency characteristics described previously while areas C and D will be considered low frequency areas. Area G can be considered as an example of a tight mode signal and in this case the notion of frequency as applied to SFD is not relevant. Anomaly identification in this mode will be driven primarily by amplitude and pattern characteristics. In particular note area E in which four sub areas a, b, c and d are defined. Within these sub areas, the $V_{max}$-$V_{min}$ differences and the number of times the particular change described by the $V_{max}$-$V_{min}$ event which happens during the transitions from a-b, b-c and c-d will fit the high frequency definition and more appropriately can be seen as a frequency transition from A-B-C-D to E. Hence, only area E will be considered to have high frequency relevant for anomaly identification purposes.

Figure 21:
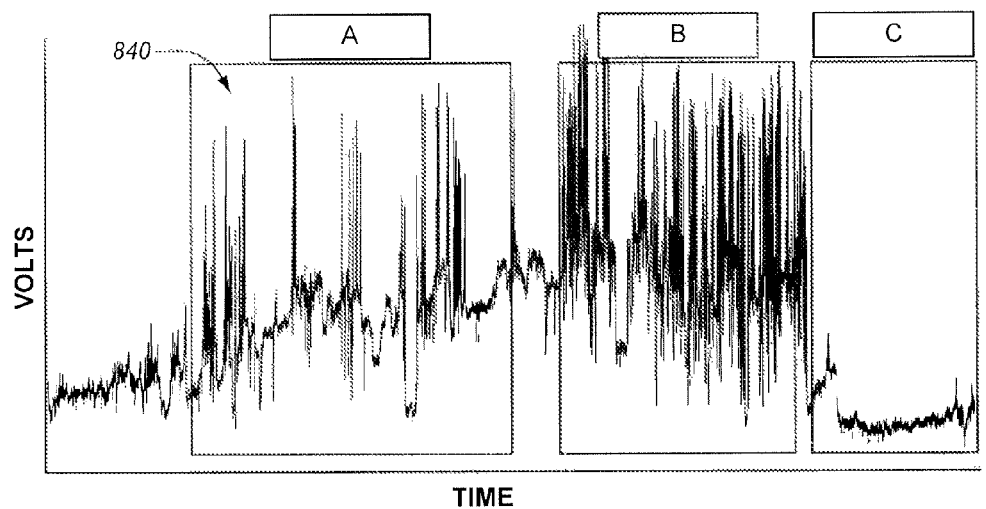
FIG. 21 is a sensor signal illustrating various frequency trends.
Figure 22:
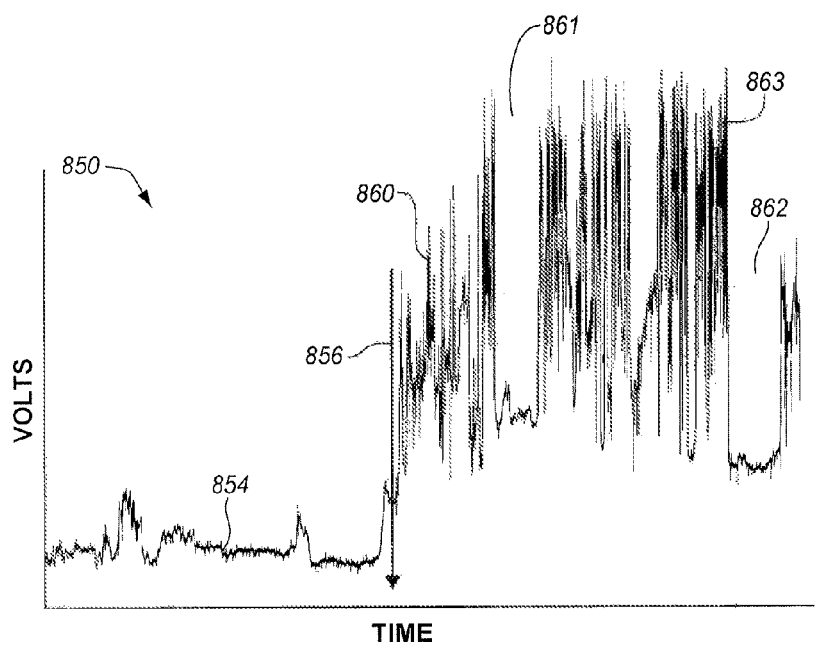
FIG. 22 is a sensor signal illustrating the concept of signal pattern change.

Signal 840 of FIG. 21 shows a transition from a low frequency area (A) to a high frequency area (B) and finally to a tight-mode area (C). It is quite apparent that area B is the densest part of the signal. The event described by the change in the mean $V_{max}$-$V_{min}$ value can therefore be simplified by noting the following two items: it represents a change from a low $V_{max}$-$V_{min}$ to a high $V_{max}$-$V_{min}$ along the transition from A to B; and, the frequency of the high $V_{max}$-$V_{min}$ event is much higher in area B. It may be noted that the reverse event (high to low $V_{max}$-$V_{min}$) transition is equally applicable to interpretation and anomaly identification. This is a direct consequence of the original observation that singular time events and changes on SFD are generally meaningless and only hold value if part of an overall signal development. Frequency and Frequency trends are therefore directly recognized by the occurrence and regularity (or lack thereof) of a significant standard deviation change of the signal voltage in any given time window and play an important role in the identification and ranking of the anomaly.

IV.6.1.3. Character and Pattern

A character change of an SFD signal can imply the occurrence of large and diverse number of events. Character changes can be very loosely tied to mean output voltage changes but this is not always the case. In general a pattern change on a SFD sensor's output is observed as a shift or change in a sequence of regularly occurring signal events.

These events are a combination of both amplitude and frequency shifts as described above. Most of these discernible pattern changes are derived from historical surveys and template crossings. A character change in general determines the overall shape of the signal as characterized by amplitude, frequency, envelope evolution etc. A particular waveform consisting of these character changes is visually noticeable on a SFD signal. Some SFD signal events associated with character changes include: A change or shift in the amplitude trend of the signal; A change or shift in the character of the signal development, for example, a signal showing only positive deviations about the perceived baseline moves to a state where it shows both positive and negative deviations; A change or shift in the signal pattern, for example, a signal showing a high frequency baseline trend moves to a low frequency baseline trend or a varying frequency trend; A change or shift in the signal envelope, for example, a signal exhibiting a cyclic/periodic behaviour to a more discrete development. Signal character changes are therefore directly realized by a sequence driven combination of the frequency and/or amplitude characteristics as described previously in any given time window and play an important role in the determination and ranking of the anomaly. Some signal pattern changes are illustrated in signal 850 in FIG. 22. At the arrow 856, it is seen that the baseline voltages move up from area 854 to area 860. Also at this point the response type changes to high frequency with a U-shaped waveform development, specifically U's 861 and 862, which are accompanied by high frequency such as at 863. Further, when comparing the signals on either side of arrow 856, it is seen that the response range changes from mostly above the baseline to either side of the baselines.

Figure 23:
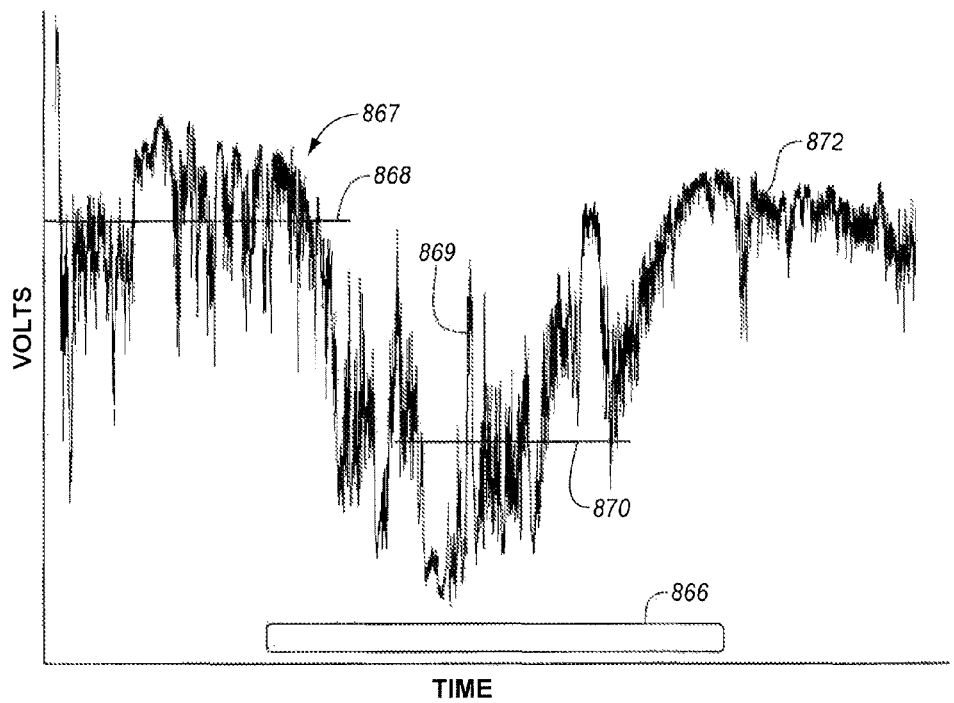
FIG. 23 is a sensor signal illustrating the concept of signal character change.
Figure 24:
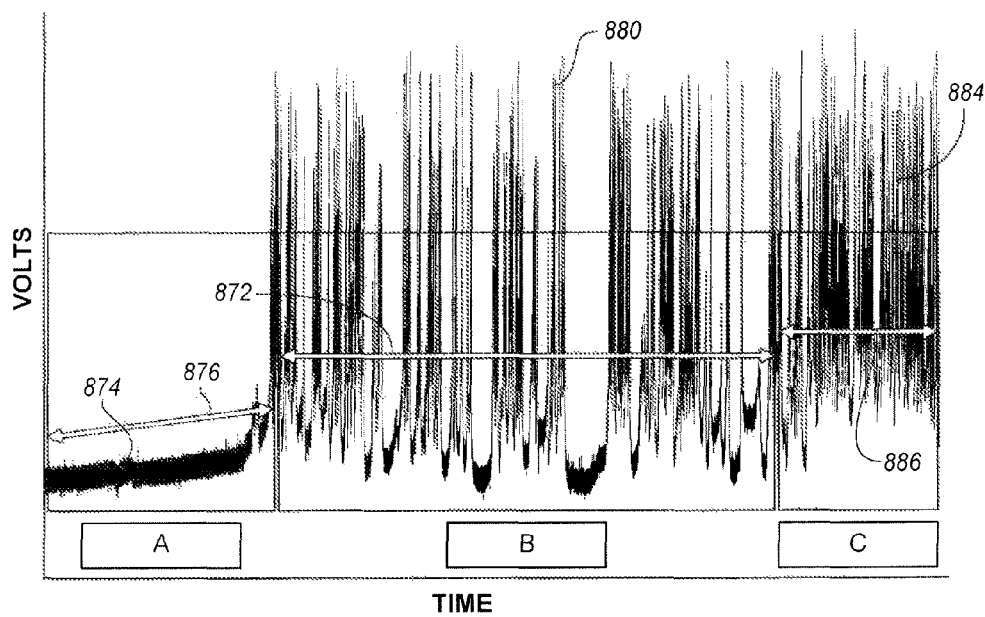
FIG. 24 is a sensor signal illustrating the concept of sequence identification.

FIG. 23 illustrates several signal character changes that are relevant to signal interpretation. The baseline voltage of the signal at 867 is shown at 868. The baseline voltage of the signal at 869 is shown at 870. It is evident that there is a character change in that the baseline voltages move down. It can be seen that the downward development in the area 867 changes to high frequency with only upwards development in the region 869 which forms a dip in the area 866. It is also evident in FIG. 23, the response changes from mostly below the baseline at the start to either side of the baseline in the region 869 and then back to the high frequency downward trending signal in the region 872. These are all examples of signal character changes.

IV.6.2. Sequence Identification

The initial point of the SFD interpretation process is the determination of the start and end of the applicable time windows, i.e., the timestamps at which the change in the frequency, amplitude or character/pattern can be observed and/or established. The identification of these time windows may be useful in establishing the overall signal quality sequences that will eventually be used for anomaly identification. The determination of the anomaly and its subsequent strength will be determined by the type and sequence of attribute changes observed within & at the immediate periphery of these time windows. Consider the signal sequence shown in FIG. 24. It has been divided into a succession of time windows—A, B and C which have been differentiated based on a change or shift in one of the primary SFD signal attributes. The transition from area A to area B is defined by the following events. As shown by comparing the levels 876 and 872 there is a baseline amplitude change and a signal character change in that the signal changes both trend, i.e., upward trend to flat trend; and pattern change, i.e., the directionality of the deviations about the baseline. There is also a signal frequency change as comparing signal 874 to signal 880. Similarly the shift from area B to area C is defined by the following events: a Baseline amplitude change as shown by arrows 872 and 886; and a signal frequency change as by comparing the signals at 880 and 884. The determination of these sequences is useful in the interpretation of the signal with respect to anomalous vs. non-anomalous waveforms, which then would relate to the overall ranking of the area/areas It is particularly noted that the signal waveform is a series of continuous changes where the same attributes that determine the anomalous areas may also determine the non-anomalous areas. Signal development throughout the length of the signal is composed of a series of changes of the individual attributes. However, the primary difference between an area and waveform marked as anomalous as compared to an area or waveform not considered anomalous is the change sequence for the individual attributes. Signal development over the course of a spatial interval will generally be composed of a number of possible sequential changes in the attributes and the starting point is usually the identification of the start and end of a particular development subsection. This is referred to as the determination of the "time windows".

We claim:

1. A gravity transducer system comprising:
   a junction comprising a first metal and a second metal, said junction forming an active capacitance, wherein change in the active capacitance is due to mechanical vibration of the junction, wherein said junction comprises a conductive bead having longitudinal bore through it, wherein said junction also comprises a conductive pin having a dielectric coating, said pin located in said longitudinal bore to form an electrical junction, and wherein said junction further comprises a dielectric polymer spacer between said bead and said pin;
   a power source for applying electrical power across said junction;
   a sensor capable of sensing voltage, said sensor electrically connected with said junction, said sensor producing a sensed signal characteristic of a gravitational signal; and
   a recording system for recording said sensed signal characteristic of said gravitational signal.

2. A gravity transducer system as in claim 1 and further comprising a vehicle capable of moving said transducer system in a rectilinear motion.

3. A gravity transducer system as in claim 1 wherein said pin and bead are made of metal, and said dielectric comprises a metal oxide.

4. A gravity transducer system as in claim 3 wherein there is an oxide layer between said pin and said bead and said oxide layer comprises silver oxide, copper oxide or other metal oxide.

5. A gravity transducer system as in claim 1 wherein said bead comprises a sandwich structure comprising a copper or gold layer formed between a first alloy layer and a second alloy layers.

6. A gravity transducer system as in claim 1 wherein said power source is a voltage source and said voltage is between 3 volts and 9 volts.

7. A gravity transducer system as in claim 1 that acts as a mechanical transducer that responds in-situ during aerial survey, converts mechanical displacement energy into electrostatic charge, and a capacitance transducer that creates a voltage in relation to a gravity change.

8. A gravity transducer system as in claim 1 that responds only to small-scale gravity anomalies and rejects slowly varying gravitational trends including topographical effects though resonance or synchronous deflection of transducer elements.

9. A method of detecting orientation changes or localized variations of gravitational field associated with subsurface density and stress changes, said method comprising:
   creating a junction of two dissimilar metals applying an electrical field across said junction, wherein said junction comprises a conductive bead having longitudinal bore through it, wherein said junction also comprises a conductive pin having a dielectric coating, said pin located in said longitudinal bore to form an electrical junction, and wherein said junction further comprises a dielectric polymer spacer between said bead and said pin;
   exposing said junction to said orientation changes or localized variations of a gravitational field;
   sensing a voltage across said junction to produce a sensed signal characteristic of said orientation changes or localized variations of a gravitational field;
   recording said sensed signal as a function of time; and
   analyzing said signal to detect said orientation changes or localized variations of a gravitational field associated with said subsurface density and stress changes.

10. A method as in claim 9 wherein said creating a junction comprises forming an adjustable resonant cavity having a trapped particle characterized by a de Broglie wave coupling with a phonon wave.

11. A method as in claim 9, wherein said exposing said junction to localized variations of the gravitational field comprises flying said junction in an aircraft, wherein the aircraft and junction are in rectilinear motion while flying.

12. A method as in claim 9 wherein said analyzing comprises analyzing signal attributes including amplitude, frequency, character, pattern, sequence and trend.

13. A method of detecting fluid entrapment including hydrocarbon deposit, said method comprising:
   providing a gravity transducer relying on an adjustable resonant cavity or relative displacement between a pin and a bead for sensing a change in a gravitational field, wherein the bead comprises a conductive bead having longitudinal bore through it, wherein the pin comprises a conductive pin having a dielectric coating, said pin located in said longitudinal bore to form an electrical junction, and wherein a dielectric polymer spacer is provided between said bead and said pin;
   moving said gravity transducer through an atmosphere or on land above said hydrocarbon deposit in a continuous rectilinear motion;
   interacting dynamically with and sensing the change in the gravitational field through electromechanical conversion through an electrical junction to produce a voltage signal indicative of said hydrocarbon deposit;
   eliminating constant background gravitational field through said resonant cavity or relative displacement;
   recording said gravity change signal at 2,000 samples per second; and
   analyzing said gravity change signal to detect said hydrocarbon deposit.

14. A method as in claim 13 wherein said moving comprises flying said gravity transducer in an aircraft at an altitude up to 3,000 meters at a speed up to 500 km/h.

15. A method as in claims 13 wherein there is an optimum altitude as a function of the size of said hydrocarbon deposit.

16. A method as in claim 13 and further comprising integrating said gravity change signal, detecting and modulating energy accumulation dynamically over time.

17. A gravity transducer system to acquire continuous gravity changes from the method as in claim 13 by exploiting high-altitude, high-speed interaction with said gravitational field using small oscillating masses to access high-frequency domains of the field.

* * * * *